(12) United States Patent
Near

(10) Patent No.: US 12,290,730 B2
(45) Date of Patent: May 6, 2025

(54) CONNECTED HOCKEY TRAINING SYSTEMS AND METHODS

(71) Applicant: Helios Sports, Inc., Portsmouth, NH (US)

(72) Inventor: William G Near, Portsmouth, NH (US)

(73) Assignee: HELIOS SPORTS, INC.

( * ) Notice: Subject to any disclaimer, the term of this patent is extended or adjusted under 35 U.S.C. 154(b) by 265 days.

(21) Appl. No.: 17/560,616

(22) Filed: Dec. 23, 2021

(65) Prior Publication Data

US 2022/0193515 A1 Jun. 23, 2022

Related U.S. Application Data

(60) Provisional application No. 63/130,107, filed on Dec. 23, 2020.

(51) Int. Cl.
| | |
|---|---|
| *A63B 69/00* | (2006.01) |
| *A63B 24/00* | (2006.01) |
| *A63B 67/14* | (2006.01) |
| *A63B 71/06* | (2006.01) |

(52) U.S. Cl.
CPC ...... *A63B 69/0026* (2013.01); *A63B 24/0021* (2013.01); *A63B 67/14* (2013.01); *A63B 71/0622* (2013.01); *A63B 2024/0028* (2013.01); *A63B 2071/0638* (2013.01); *A63B 2071/0647* (2013.01); *A63B 2071/0666* (2013.01); *A63B 2214/00* (2020.08); *A63B 2225/54* (2013.01)

(58) Field of Classification Search
CPC .... A63B 2024/0028; A63B 2071/0638; A63B 2071/0647; A63B 2071/0666; A63B 2214/00; A63B 2225/54; A63B 24/0021; A63B 67/14; A63B 69/0026; A63B 71/0622
See application file for complete search history.

(56) References Cited

U.S. PATENT DOCUMENTS

| | | | |
|---|---|---|---|
| 10,671,971 B1 * | 6/2020 | Nyswonger | G06K 7/10366 |
| 2007/0173970 A1 * | 7/2007 | Shachar | G05B 19/4183 |
| | | | 700/225 |
| 2009/0147025 A1 * | 6/2009 | Grigsby | H04N 21/2187 |
| | | | 345/633 |
| 2013/0073248 A1 * | 3/2013 | Perkins | A61B 5/6895 |
| | | | 702/141 |
| 2019/0147653 A1 * | 5/2019 | Henderson | G06F 3/011 |
| | | | 345/633 |
| 2022/0054927 A1 * | 2/2022 | Theriault | A63B 71/0622 |

\* cited by examiner

*Primary Examiner* — Thomas H Henry
(74) *Attorney, Agent, or Firm* — Lambert Shortell & Connaughton; David J. Connaughton, Jr.; Justin P. Tinger

(57) ABSTRACT

A connected hockey training system that records and generates digital displays of the position and parameters of a smart hockey puck. The system is also configured to providing training programs about which the smart hockey puck is used to track progress of those training tasks and generate a score or other statistical parameters related thereto, such as feedback on stickhandling and shooting performance.

19 Claims, 24 Drawing Sheets

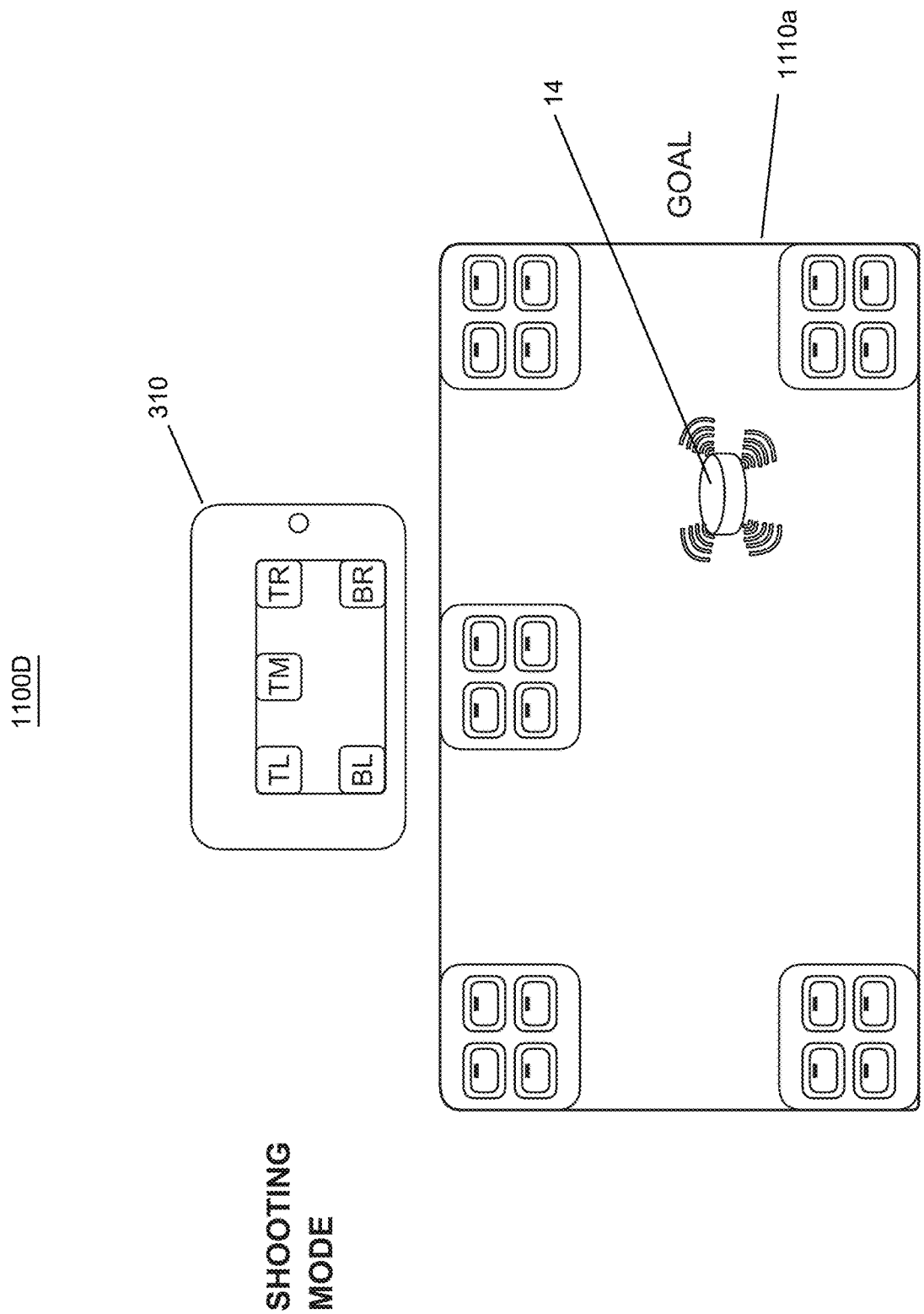

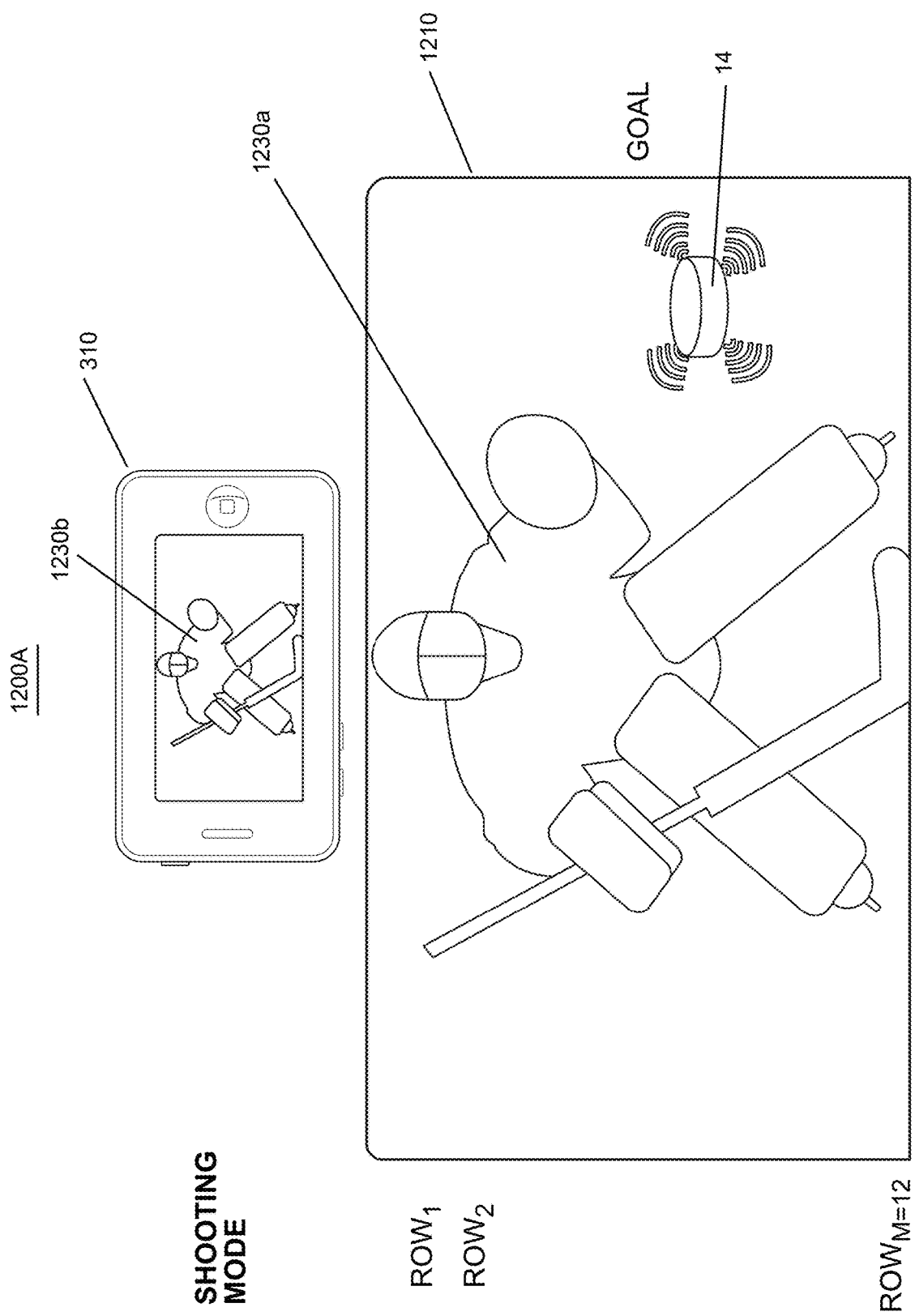

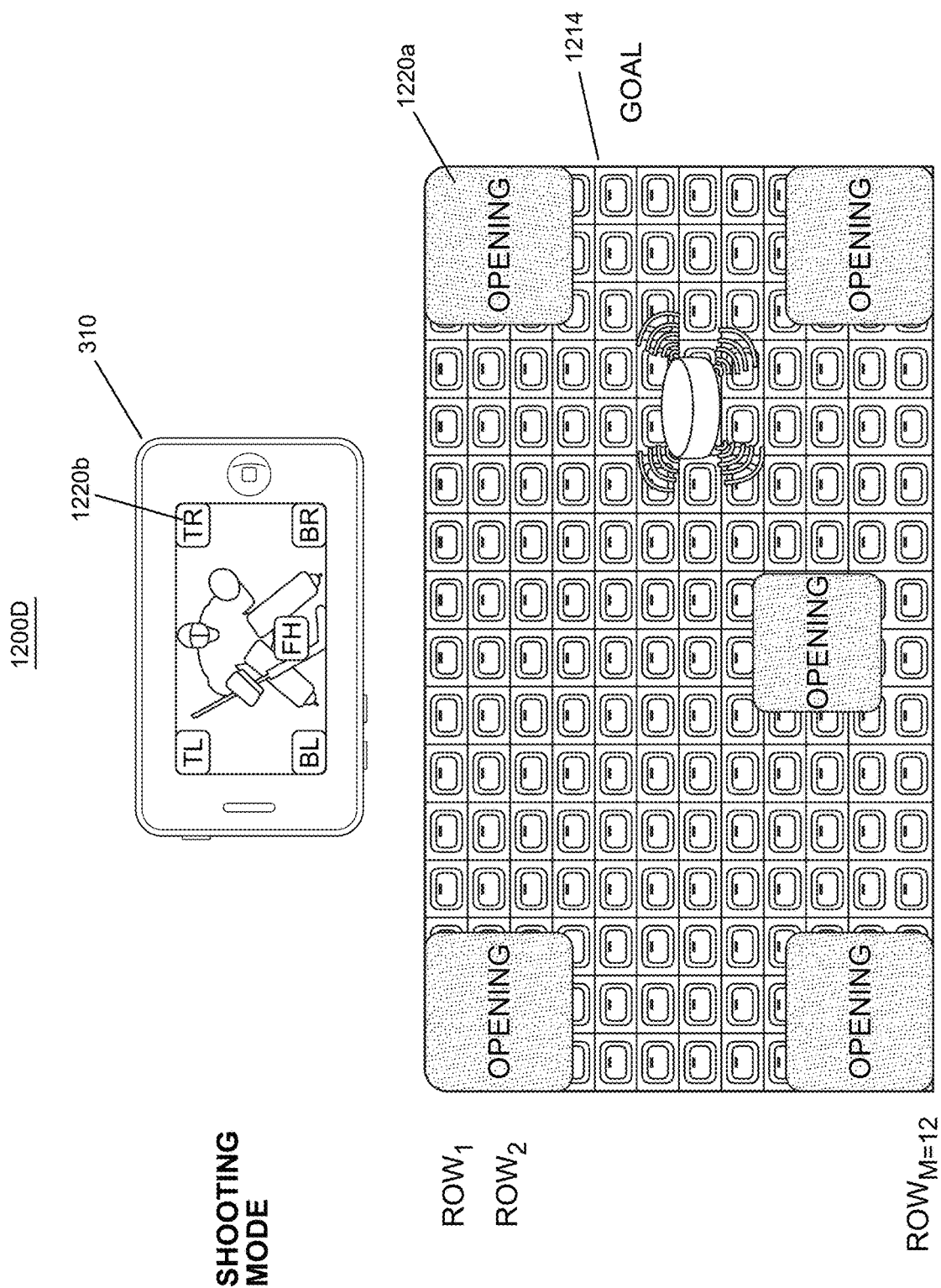

CONNECTED HOCKEY TRAINING SYSTEMS AND METHODS

FIELD OF THE INVENTION

The present invention relates generally to various aspects of a connected hockey training system that provides digital feedback on stickhandling and shooting performance.

BACKGROUND OF THE INVENTION

Hockey training has long been a disconnected process without actionable training feedback. Many players are accustomed to training independently without actionable feedback or under limited and costly circumstances with a coach providing feedback during training sessions. While training independently the player is often missing the expertise of a coach leaving them without positive feedback for good performance and corrective feedback for undesired performance. Alternatively, time spent training with a real coach is an expensive and time-limited option that many players do not have the privilege to have. What is proposed is a new way to provide digital coaching and actionable training feedback to a player. Previous attempts to provide digital feedback have fallen short of the resolution (detail) and responsiveness (timing) necessary for refining the key skills of stickhandling and shooting. The present application seeks to solve these and other problems that will become apparent to those skilled in the art.

SUMMARY OF THE INVENTION

The present application relates to a connected hockey training system comprising a smart puck or smart ball having an electronics board embedded therein and one or more embedded or applied RFID tags positioned about various additional equipment used in ice hockey, field hockey or lacrosse. These additional equipment components can include, sticks, pads, helmets, and other worn gear, as well goal frames, within the rink or field, or about the perimeter of the rink or field, as well as on smaller training surfaces such as synthetic ice.

The electronics board includes a processing unit, memory, a plurality of sensors for detecting motion along one or more axes, and at least one antenna. The electronics board of the smart puck or smart ball or smart ball is configured to read information from embedded or applied RFID tags and further process motion data associated with the smart puck or smart ball.

The embedded electronics board can measure, process, and transmit information from a plurality of sensors including acceleration, velocity, position, orientation, jerk, rotational velocity, rotational acceleration, rotational position, temperature, serial number, tag identifier, player identification, and battery level of the device.

The embedded electronics board can further include wireless transceivers and communication protocol (i.e. Bluetooth, BLE, RFID, NFC) to transmit information or commands from the smart puck or smart ball to another computing device (i.e. mobile device, computer, charging source), and oppositely, to receive information or commands from another computing device to the smart puck or smart ball (i.e. player identification, mobile device, computer, charging source).

In one embodiment the electronics board is configured to have an idle state and an active state. The active state can be initiated by the computing device, upon movement of the smart puck or smart ball or when in close proximity to and detecting of the one or more embedded or applied RFID tags.

The connected hockey training system can also include a computing device, such as a smartphone or tablet, for receiving and displaying the processed data associated with the smart puck or smart ball and stickhandling and/or shooting training aids.

The connected hockey training system can further be configured to include a remote or cloud-based server that can receive, store and process received data directly or via the computing device. The cloud-based server can also be used to deliver data such as new training modules in the opposite direction to the computing device to be used with the smart puck or smart ball and stickhandling and/or shooting training aids.

The present application also relates to a smart stickhandling board (training aid) with one or more embedded or applied RFID tags.

In one embodiment the one or more embedded or applied RFID tags are organized with M rows and N columns in a grid or array (M-by-N grid or array).

In one embodiment each of the one or more embedded or applied RFID tags organized in an M-by-N grid or array correspond to a unique placement location on the board and by reading the unique identifier for a RFID tag, the location of the smart puck or smart ball on the stickhandling board can be determined.

In one embodiment the computing device is provided a mapping file corresponding to the M-by-N grid or array of RFID tags embedded or applied to the smart stickhandling board such that upon receiving a processed RFID tag identifier from the smart puck, the computing device can resolve the specific location of the smart puck by referencing the mapping file.

The present application also relates to a set of one or more smart shooting aids with one or more embedded or applied RFID tags.

In one embodiment the one or more shooting aids are shooting targets to be placed at locations on a goal.

In another embodiment the shooting aid is a single sheet cover all or most of the goal with embedded or applied RFID tags covering all or most of the goal's area.

In one embodiment the shooting targets are pre-assigned specific locations for mounting on a goal (i.e. Top Right (TR), Bottom Left (BL), Top Middle (TM)) such that upon a smart puck or smart ball hitting a target and reading its one or more embedded or applied RFID tags, a processed RFID tag identifier from the smart puck or smart ball can be communicated to a computing device.

In another embodiment a hockey motion training system comprises: a smart puck having an electronics board embedded therein, wherein the electronics board is coupled to an RFID scanning system, configured to read a plurality of RFID tags, and a wireless communication component configured to transferred scanned RFID tag data to a computing device; a grid of RFID tags embedded in or disposed under a training surface; a training application running on the computing device, and configured to: receive mapping data associated with the grid of RFID tags, receive sensed RFID tag data from the smart puck, and generate and display motion data associated with the smart puck based on comparing received mapping data to received sensed RFID tag data.

The training application can be further configured to run a training module, which can include displaying a particular training motion pattern to be performed by a user of the hockey motion training system on the computing device.

The training application can be further configured to compare received sensed RFID tag data to run training module and determine at least one compliance parameter.

The compliance parameters include: accuracy of motion, timing associated with training module, speed of motion, and location.

The training surface can be comprised of at least one of: layer of ice, layer of synthetic ice, and a base layer.

The grid of RFID tags is disposed between the base layer and the ice or synthetic ice layer.

The hockey motion training system can further include a plurality of wearable RFID tags disposed on a target user. It can also include a plurality of targetable RFID tags disposed about a target positioned above the training surface.

The computing device can part of a head mounted display.

In another embodiment a hockey skills training method comprises the steps of: mapping the unique identifiers of each of an M×N grid of RFID tags disposed under a training service into a mapping data set; generating at least a portion of a virtual representation of the M×N grid on a display; selecting from a list a training task to be performed using a smart hockey puck that includes an RFID reader and wireless transmitter, wherein the training task includes mimicking at least portion of a pattern; generating a virtual hockey puck on the display; tracking the motion of the smart hockey by comparing sensed RFID tags associated with the M×N grid to the mapping data set; determining based on the tracked motion at least one of: accuracy of the pattern, time to complete the training task, and speed of accomplishing the training task.

This method can further include the step of comparing the completed training task to a previously completed training task.

Another step can include comparing the completed training task to a database of users who have previously completed training task to determine a ranking score.

Also, the method can include the step of comparing the completed training task to a previously completed training task.

Also, the method can include the step of generating a virtual obstacle on a display as part of one of the training tasks about which a user is to navigate the smart hockey puck around.

Also, the method can include, further including the step of generating a virtual target on a display as part of one of the training tasks about which a user is to shoot the smart hockey puck at, and wherein the smart hockey puck further includes an accelerometer to determine the velocity and angle of each shot.

The display can be a virtual reality headset and the method can further include the step of a user wearing the virtual reality headset while performing the training task.

The step of mapping the M×N grid of RFID tags can include applying the RFID tags onto a surface at time of manufacturing and using an RFID scanner to read the location of the unique identifiers of each of an M×N grid of RFID tags to generate a mapping file to be stored on a cloud server.

A scannable QR code on the training surface can be provided that allows the stored mapping file unique to the M×N grid of RFID tags on that training surface to be downloaded from the cloud server.

The above-described smart stickhandling board and targets, while utilizing a common set of interfaces between a smart puck, one or more embedded or applied RFID tags, computing device and cloud server, can be utilized independently or in combination for various connected hockey training system implementations.

The present device and methods apply to recognizing the specific patterns or motions of the sport of ice hockey but can also be extended to other sports and activities.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 5A-C illustrate the various layers of the smart training surface of FIG. 4;

FIGS. 11A-D illustrate a connected hockey training system that includes a smart puck, mobile computing device and a goal with smart shooting targets with embedded or applied RFID tags, and various modes of this system;

FIGS. 12A-D illustrates another embodiment of a connected hockey training system with a smart puck, mobile computing device and a goal with smart shooting targets with embedded or applied RFID tags;

DETAILED DESCRIPTION OF THE INVENTION

As noted in the background section, one of the purposes of the present embodiments is to improve capabilities of hockey training by providing digital coaching feedback on stickhandling and shooting performance.

Figure 1:
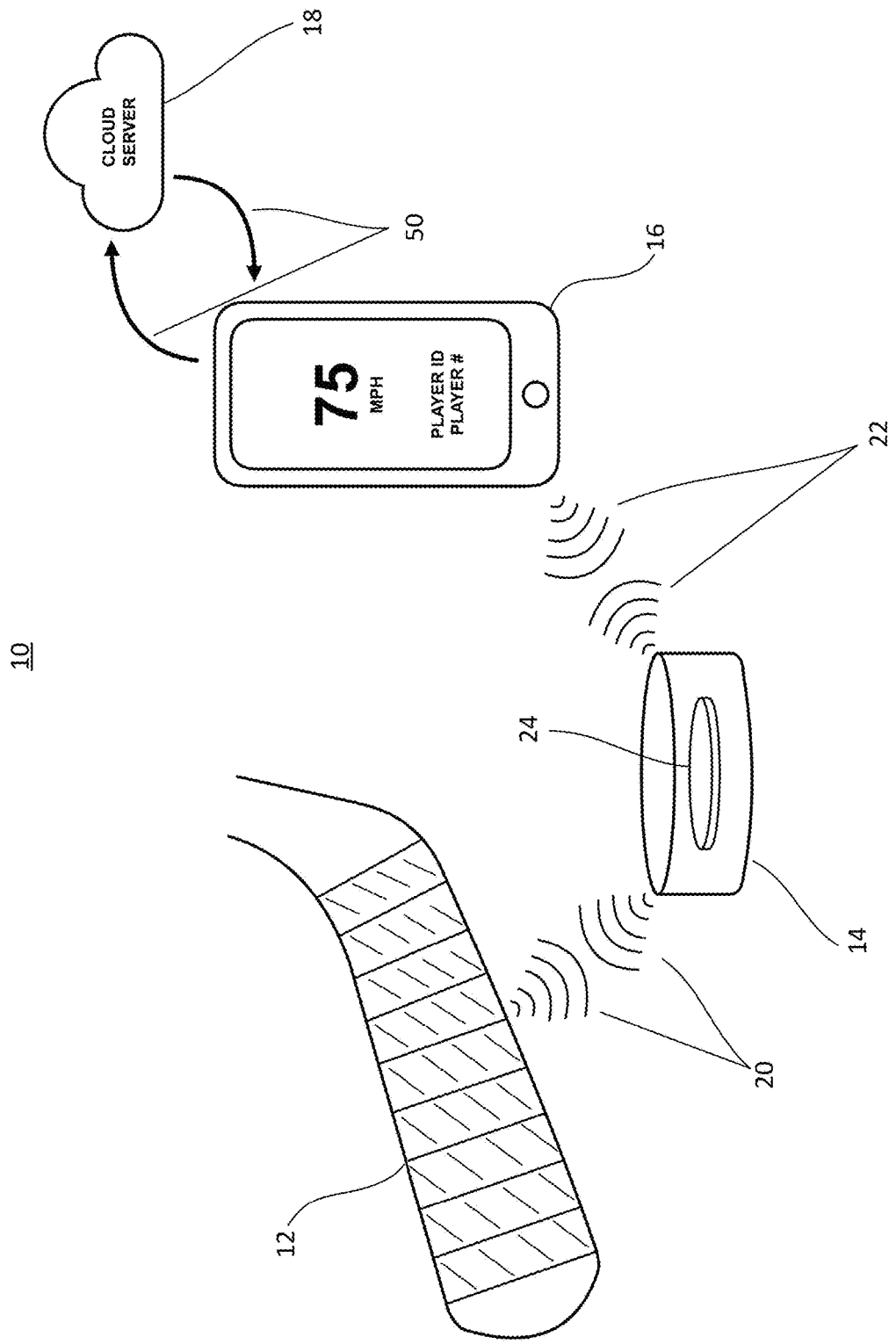
FIG. 1 illustrates a smart hockey puck system.

FIG. 1 illustrates an embodiment of a smart hockey puck system 10 which is comprised of hockey stick 12 having associated RFID transceiver(s), smart hockey puck 14, computing device 16, and remote or cloud-based server 18. One or more RFID tags can be attached to a portion of the blade of hockey stick 12. This allows for certain amount of wireless communication 20 between the hockey stick 12 and the smart hockey puck 14. For example, when the smart hockey puck 14 comes within proximity of or contact with the hockey stick, the smart hockey puck can register that it is within a certain proximity of a particular hockey stick. As further shown in FIG. 1, smart hockey puck 14 can also wirelessly communicate 22 with a computing device 16, such as a smartphone, tablet, smartwatch, laptop, desktop and the like. Depending on computing power, data and so forth, the computing device 16 can transfer via network 50 information to be processed on a remote server or cloud-based server 18. Resulting and historical information can then be relayed back to the computing device 16 and displayed in various formats for further analysis. Such information can be valuable for players, coaches, scouts and so forth.

Figure 2A:
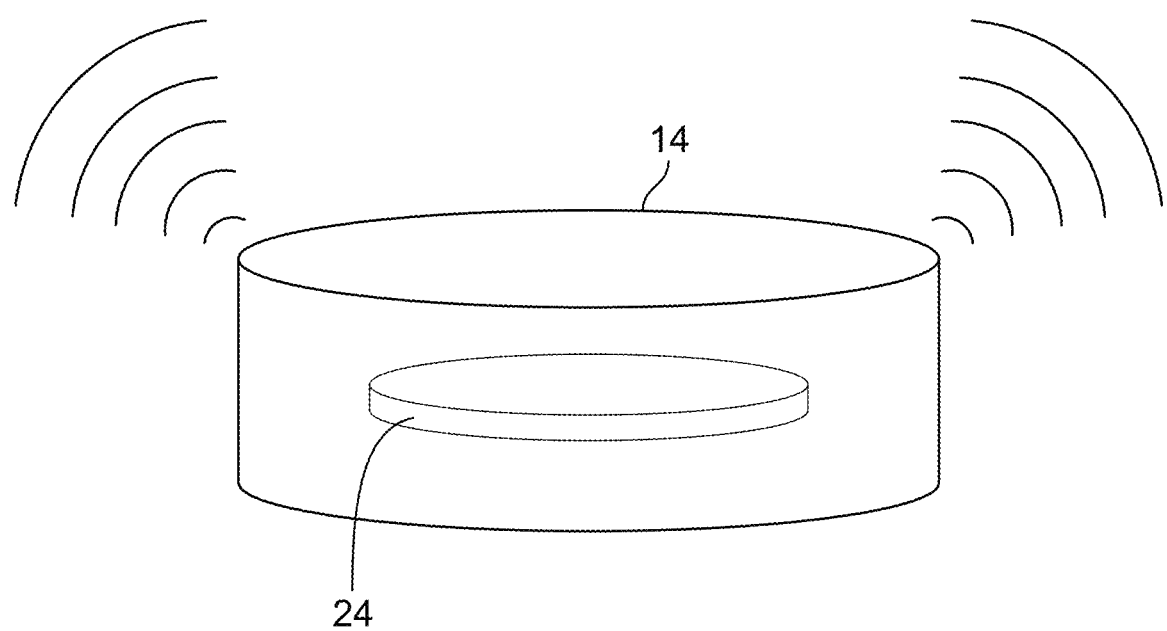
FIG. 2A-B illustrates a smart hockey puck with embedded electronic board, sensors, antenna, and transceivers for detecting, processing information associated with said puck and surrounding objects.
Figure 2B:
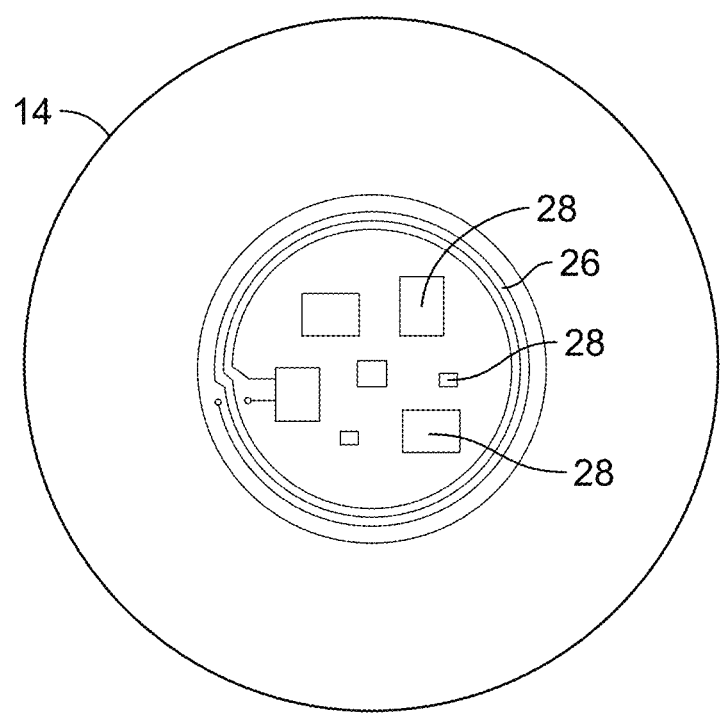

FIGS. 2A-B illustrate the smart hockey puck with an embedded electronics board 24 disposed inside thereof. The electronics board 24 can include an RFID antenna 26 and various electronic components 28. The antenna 26 as shown, is in a circular pattern, which enables for omnidirectional signals to be emitted and received. The electronic components 28 can include: batteries, accelerometers, wireless transceivers ((i.e. Bluetooth, BLE, RFID, NFC, GPS), gyroscope sensors, magnetometer sensors, IMUs, processing chips, microcontrollers, memory, charging ICs, magnets, and other various components to enable the intercommunication and functionality between the various sensors, processing and memory components, power conditioning and charging, as well as transmitting and receiving information to and from the smart hockey puck.

In one embodiment of the present application, pre-manufactured RFID tags are integrated into various pieces of equipment in usually a grid-like configuration. A mapping file containing the unique identifier associated with each RFID tag and its location within the grid can be uploaded or associated to a user's profile on a hockey training application running on a smartphone or computer. The pieces of equipment with integrated RFID tags can also come with a QR code, file or linked to a file, to enable an easy uploading or associating of the mapping file.

Figure 3:
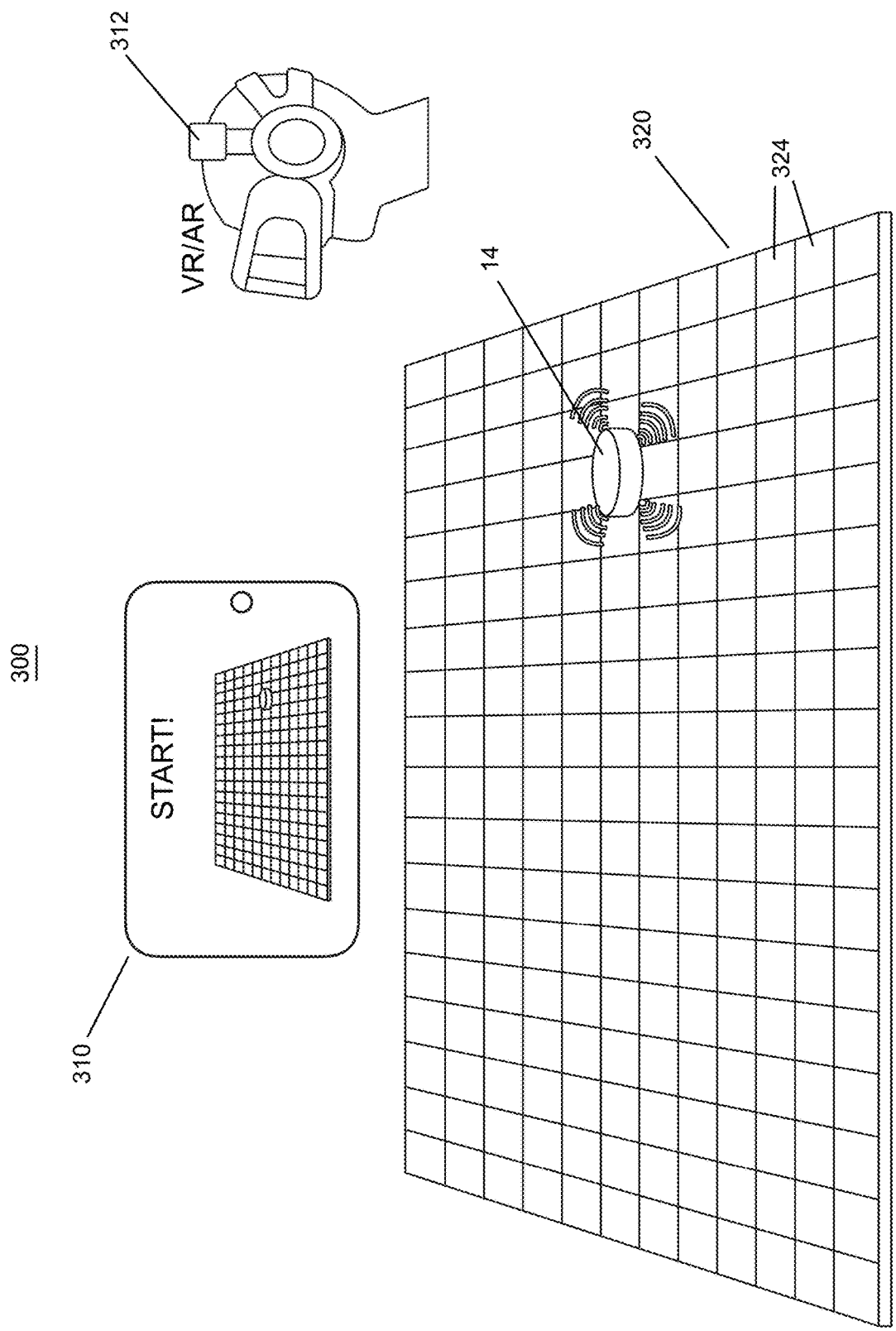
FIG. 3 illustrates a connected hockey training system with a smart puck, computing device and smart stickhandling board with embedded or applied RFID tags.

FIG. 3 illustrates a connected hockey training system with a smart puck 14, mobile device 310 and smart stickhandling board 320 with embedded or applied RFID tags 324. Also shown is headgear 312 that is configured to hold the computing device 310 in front of the user's viewing path. In alternative embodiments the headgear 312 can be a fully integrated headset having built-in computing capabilities including a processor, memory, wireless or wired communication means, audio and display means. Various virtual reality headsets currently exist in the market, which could be configured to utilize the training software.

For instance, goalie gear, which comprises multiple pads can have a mapping file associated with each pad. In the instance where a pad can be used interchangeable, say on the right or left side of the goalie's body the application can allow the ability to switch those mapping files within the app to display the correct mapping files for the correct time period of use.

Other pieces of equipment, such as a shooting targets or cloth, which is configured to be mounted on or draped over a goal, can have its own mapping file for uploading to the user application. Even individual sections of synthetic ice, such as 1'×1', 2'×2', or other sizes of synthetic ice tiles can each have a mapping file associated therewith and be linked in the application. By completing this linking of the mapping file to the user application, the user application can provide visual feedback to the user about the location of smart puck or ball interactions.

Figure 4:
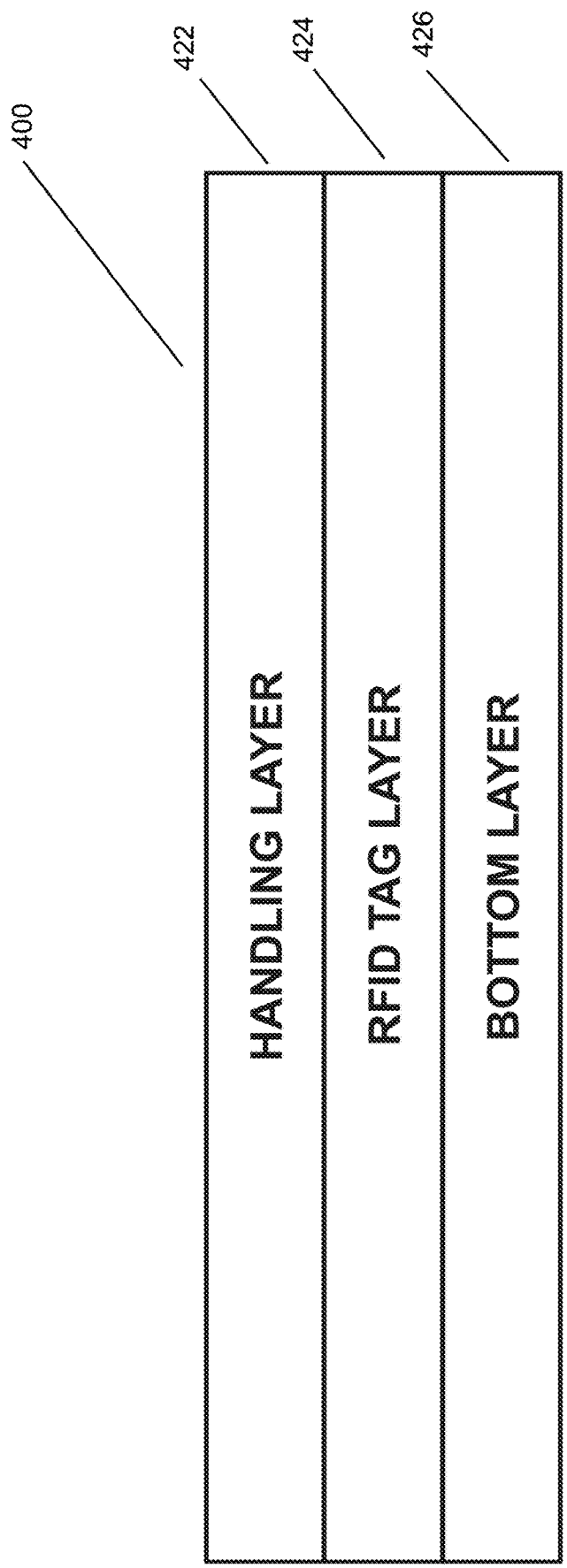
FIG. 4 illustrates a side view of a multi-layer smart training surface.

FIG. 4 illustrates a side view of a multi-layer smart training surface 400, which includes a handling layer 422, RFID tag layer 424, and bottom or support layer 426. One of the purposes of the smart training surface 400 is to provide a training surface, where integrated RFID tags can communicate with a smart hockey puck to be able to track movement of the smart hockey puck relative to the training surface. It should be noted that in some configurations, the training surface could be comprised of only a RFID tag layer and handling layer. In another configuration, the handling layer could fully surround the RFID tags, so that they are fully embedded within the handling layer itself. For applications using synthetic ice, this could readily be accomplished. Even applications using a thicker layer of ice, this could also be accomplished.

Figure 5B:
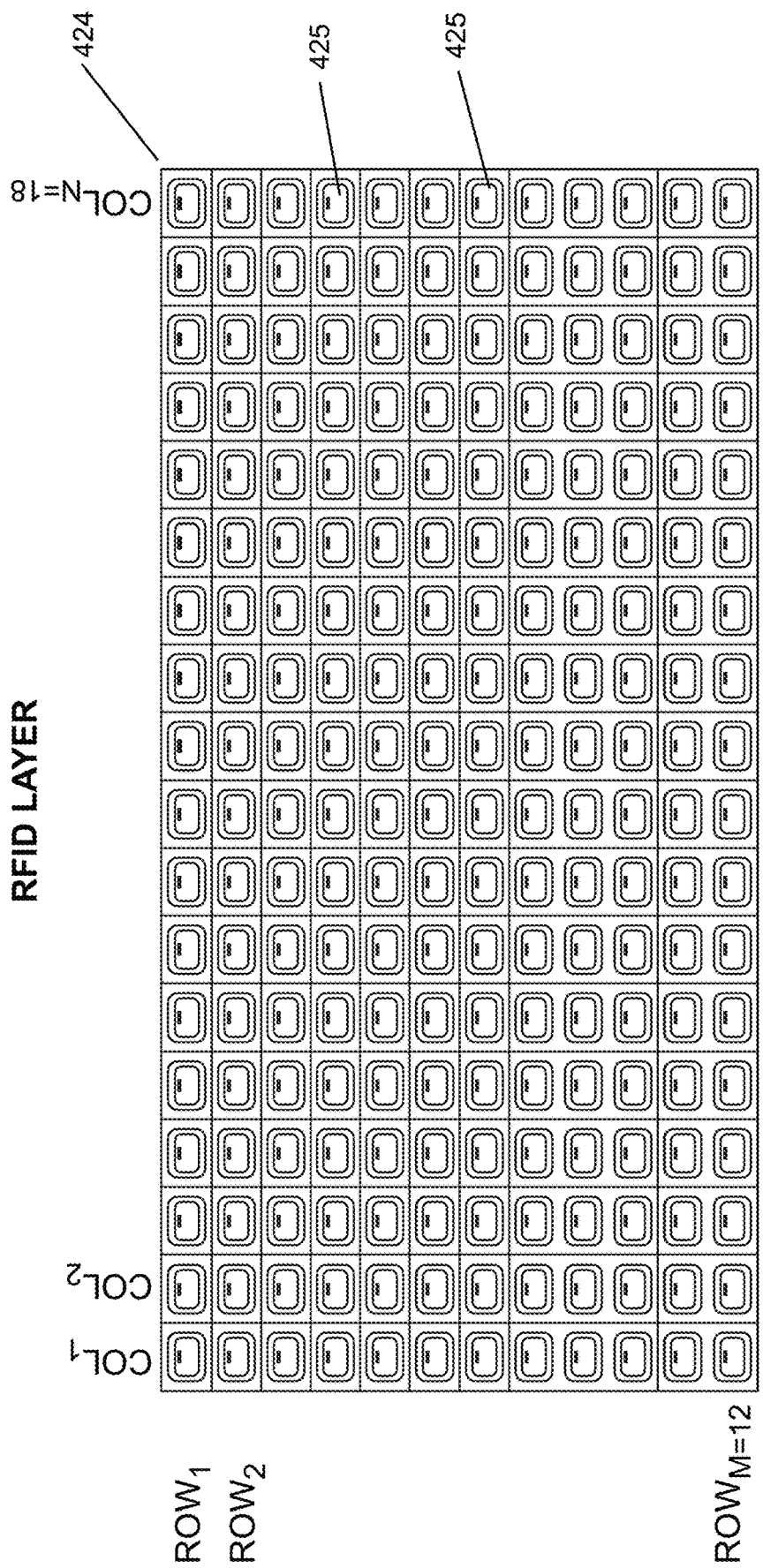
Figure 5C:
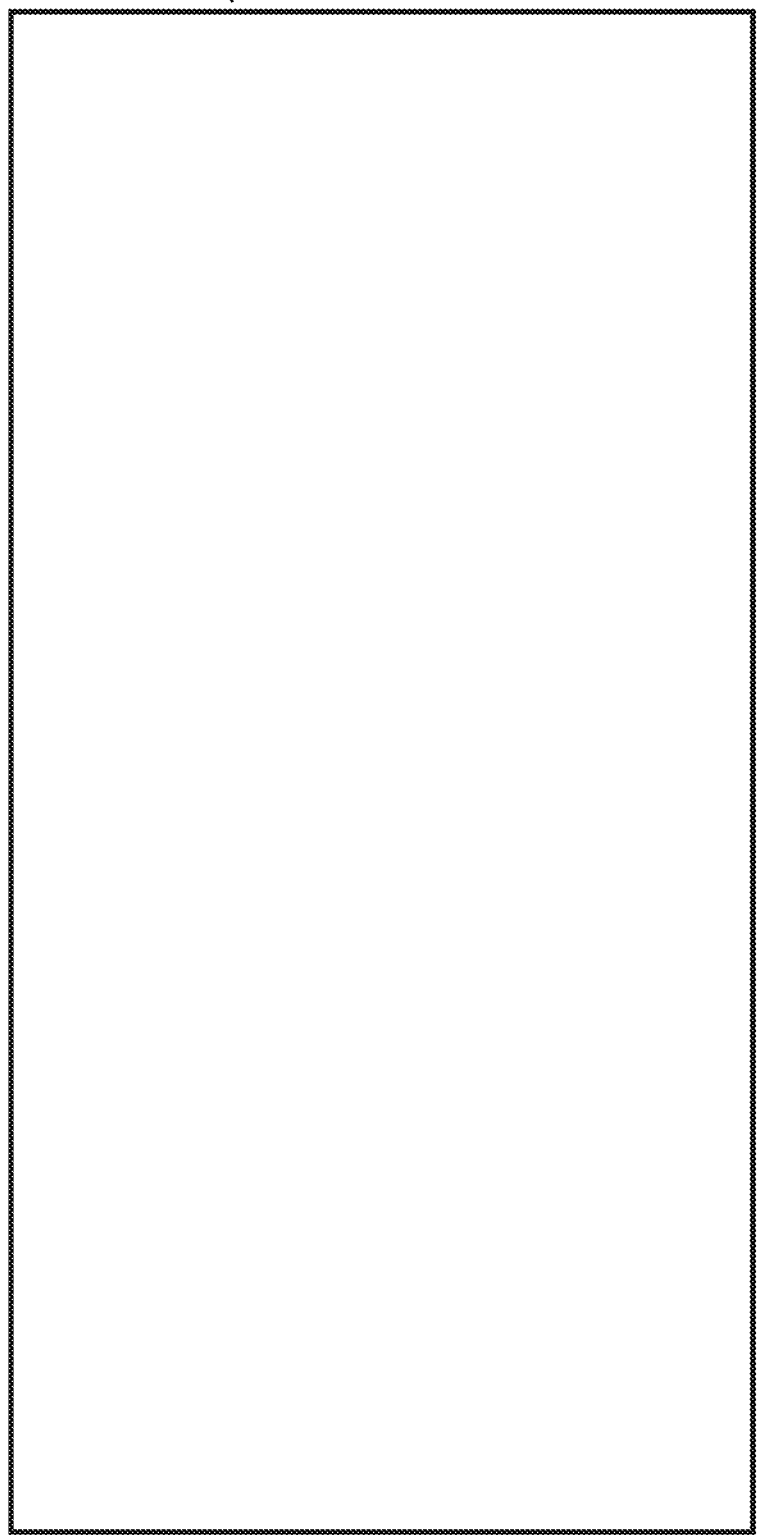

FIGS. 5A-C illustrate the various layers of the smart training surface of FIG. 4. The handling layer, depending on the intended use of the training surface could be comprised of ice or synthetic ice for stickhandling training purposes, but in the instance of the smart training surface being used as a wearable or target, the handling layer 422 could be formed of durable, impact resistant or even malleable material including various plastics, so long as the handling layer allows sufficient wireless communication for RFID reading activity to occur. The RFID tag layer 424 can be comprised of an M×N grid of individual RFID tags 425 each having a unique identifier associated therewith. Again, as noted above each unique RFID tag can be mapped with location information within the M×N grid as part of a mapping file that is specific to each M×N grid. The M×N grid can include any number of rows and columns.

The RFID tags could be passive or active, but one of the advantages of using a smart hockey puck, is that the RFID tags could be passive as they are powered by the signal emitted from the smart hockey puck. This also allows for the system to be used in places without needing to provide power, other than to charge the smart hockey puck or the computing device used.

The bottom layer 526 or support layer 526, shown in FIG. 5C can be formed of a material to support the top two layers. In some instances, it can also be used to enhance the reflection of the RFID tag layer. For example, instead of being a material that allows signals to pass through, it could reflect those signals or otherwise guide those signals. Ferrite is one material the bottom layer could include or be formed of to help with directing the signals.

In the instance, where the bottom layer is part of a stickhandling training surface, it could be formed of concrete, wood, or some other structural layer. Where the bottom surface is part of a wearable or other type of target it could be formed of a durable or malleable material designed to take the impact of a hockey puck directed at it.

In some variations a large (or small depending on desired size) roll of RFID tags is configured to be rolled out onto a pad, such as concrete, a tarp, or ground covering, or even the ground itself. A layer of frozen ice or synthetic ice can be built up on top to form an ice-skating rink or platform. Again, a mapping file can be associated with the large roll comprised of M×N rows and columns of RFID tags for tracking location across this larger surface. In alternative configurations, individual squares, rectangular or even interlocking shapes can be placed down, each having its own mapping file. As they are laid down the mapping file of each can be entered into an arranging program to form an overall mapping file of the entire ice rink for example, so that the relationship of each RFID tag relative to the other can be identified.

Figure 16:
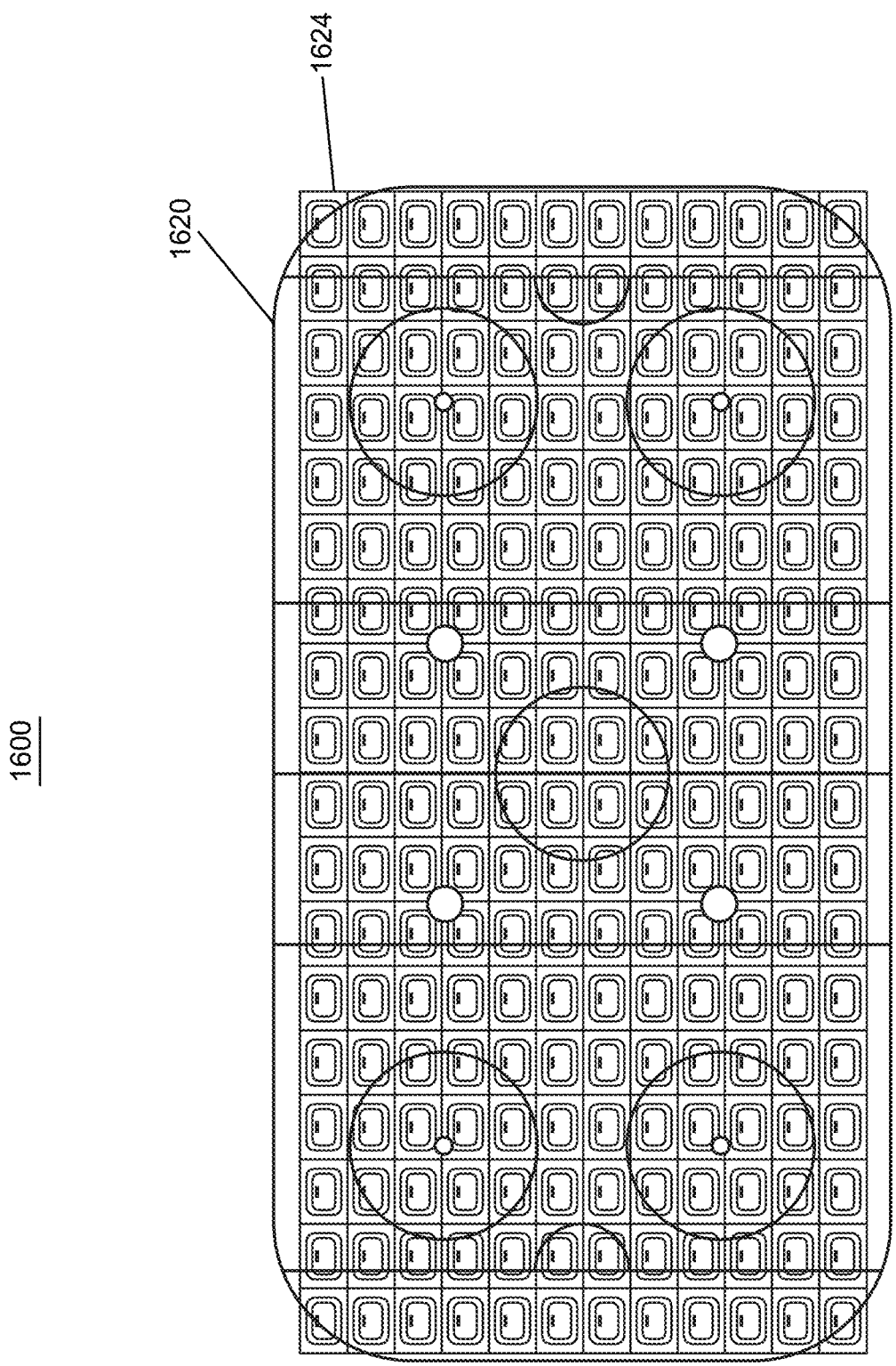
FIG. 16 illustrates a mat or roll of RFID tags placed beneath the ice of an ice or synthetic ice rink.

The electronics board on the smart puck 14 can be figured to read the RFID tags from up to 6 inches and even 10 inches away, thus the thickness of the ice formed can be adequate for the desired application, while still being able to read each of the RFID tags. FIG. 16 illustrates and RFID tag laid under the ice of a rink. When lines are formed in the rink, scanners can be utilized to associate the RFID tags under the lines or face-off circles with the associated line or face-off circle, which can then become part of the mapping file.

The hockey training system, as noted above, can include the smart puck with an electronics board embedded therein, with components and capability to scan RFID tags, store the scanned tag data, at least temporarily, and transmit wirelessly the scanned tag data, to a wireless computing device and/or the cloud for additional processing of the tag data. This can then be displayed on an application run on a smartphone or computing device, which can include operating in a number modes such as those shown in FIGS. 6-10.

Figure 6:
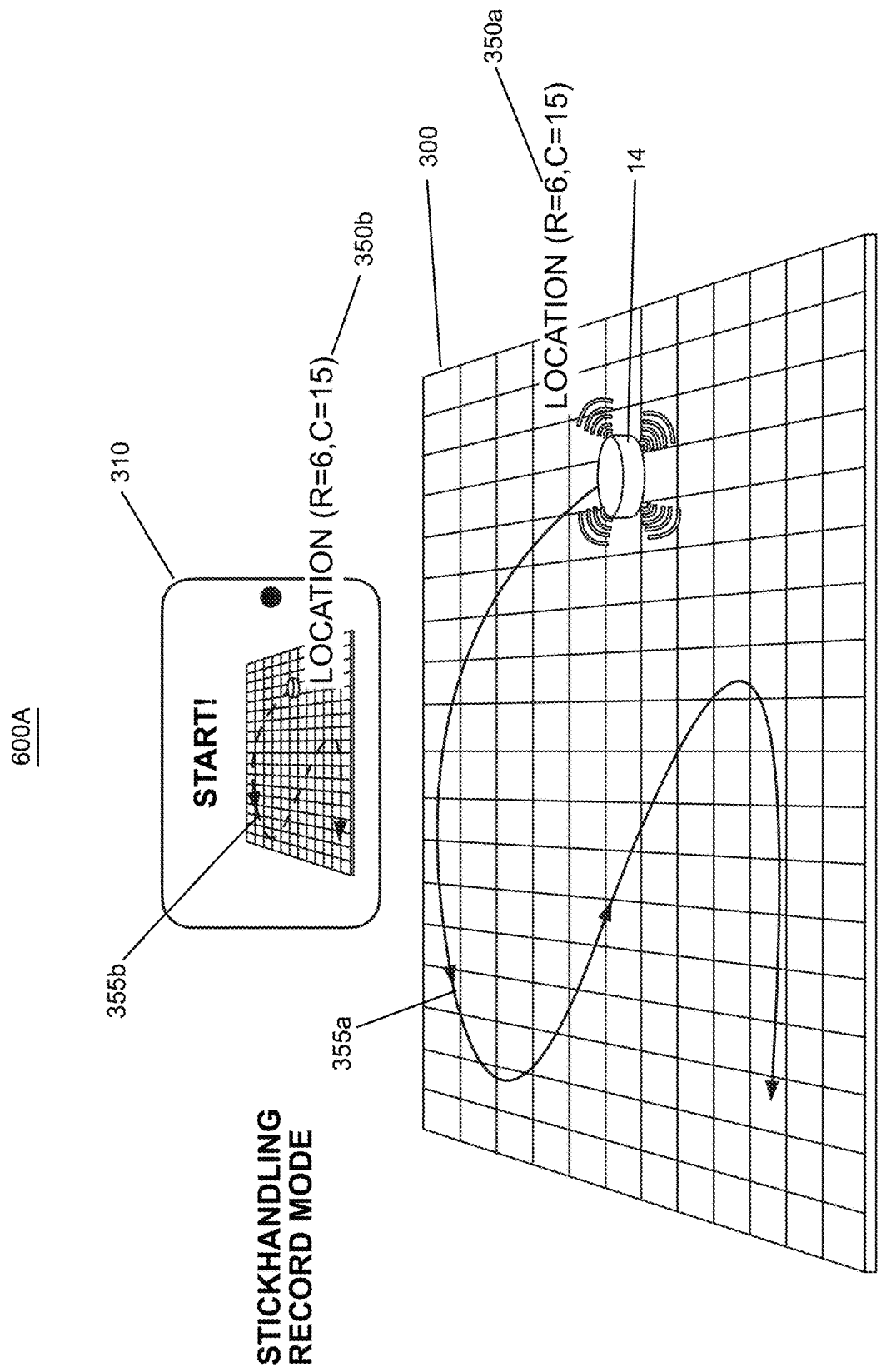
FIG. 6 illustrates a stickhandling record mode system.

FIG. 6 illustrates a stickhandling record mode system 600A, which includes displaying on computing device 310 a virtual representation of the training surface 300, where the smart hockey puck 14 resides. A virtual puck 14V can also be displayed on computing device 310. The location information 350a, which is determined by using the smart hockey puck 14 to scan and identify the unique identifier(s) of the M×N grid of the training surface 300, which is then compared to the mapping file to determine a virtual location 350b to be displayed on the computing device 310. While in recording mode, the actual path 355a of the smart hockey puck 14 can be recorded and displayed on computing device 300 as the virtual path 355b. Other metrics associated with the recorded path can also be displayed and will be discussed in other modes of operation below.

Figure 7:
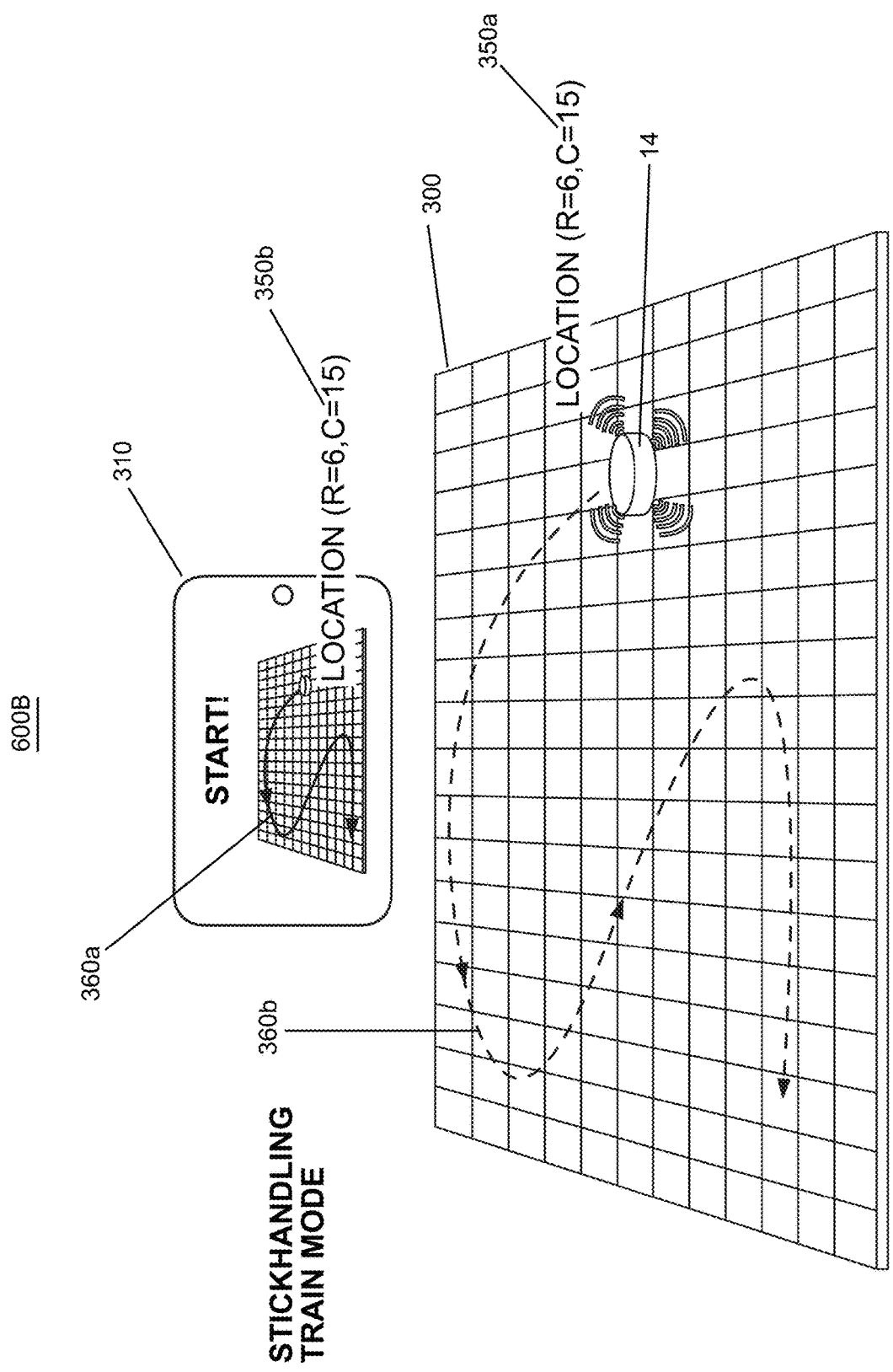
FIG. 7 illustrates a stickhandling train mode system.

FIG. 7 illustrates a stickhandling train mode system 600b, which includes displaying a virtual path 360a of which the user should attempt to emulate, and which gets recorded as the real path 360b or pattern of the smart hockey puck 14. Similarly, an actual location 350a of the puck can be used as a starting point, which is conveyed as a virtual point on the display of the computing device 310.

Figure 8:
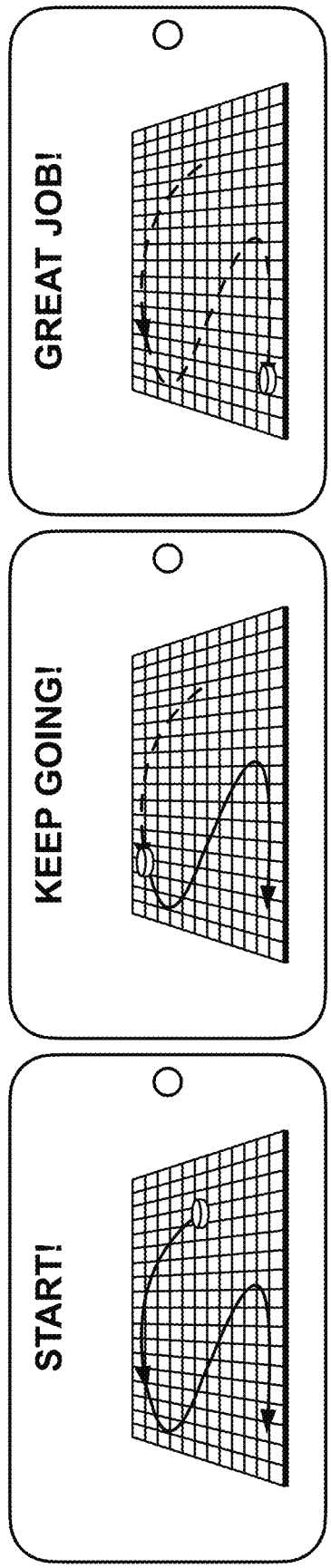
FIG. 8 illustrates a sequence of mobile screens for a stickhandling train mode.

FIG. 8 illustrates a sequence of screen views of the computing device 310 for the stickhandling train mode. Displayed in screen 370a is the beginning of the training mode, where the virtual hockey is at the beginning of the path to be mimicked using the smart hockey puck, screen 370b illustrates a partial completion as the user attempts to follow the virtual path, and screen 370c illustrates a completion of the virtual path in the training mode.

Figure 9:
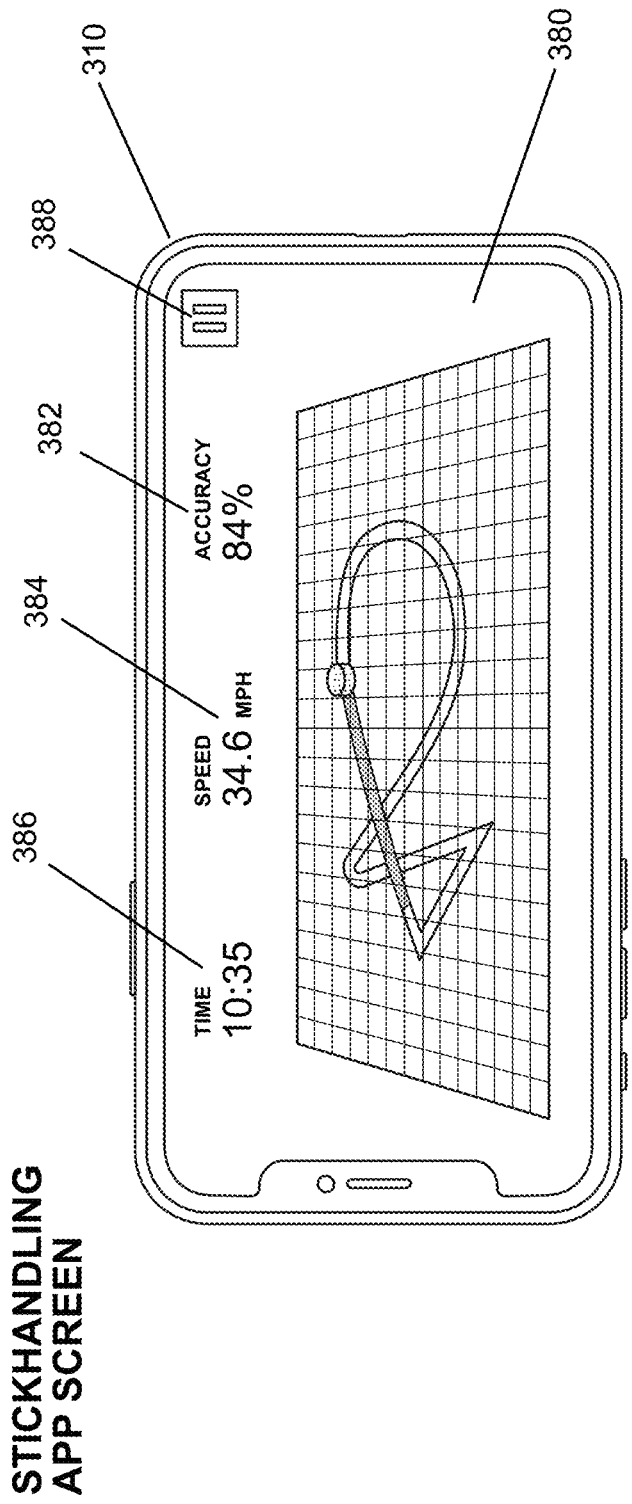
FIG. 9 illustrates a screen view showing the recorded session and statistics associated with the stickhandling training mode.

FIG. 9 illustrates a screen view 380 showing the recorded session and statistics associated with the stickhandling training mode. Here the user can play or pause 388 a virtual recreation of the recorded actual path of the smart hockey puck. Statistics showing the accuracy 382 of the actual path as compared to the intended path can be displayed, as well as the speed 384, which can include top speed, average speed and so forth. The amount of time 386 it took to complete the training mode mimicking task can also be displayed. This information can further be compared with others who attempted this similar training task, where additional information regarding rankings and total score can be displayed. If a user completes this same task multiple times, their best times, speeds, and scores can be calculated, as well as their overall averages.

Figure 10:
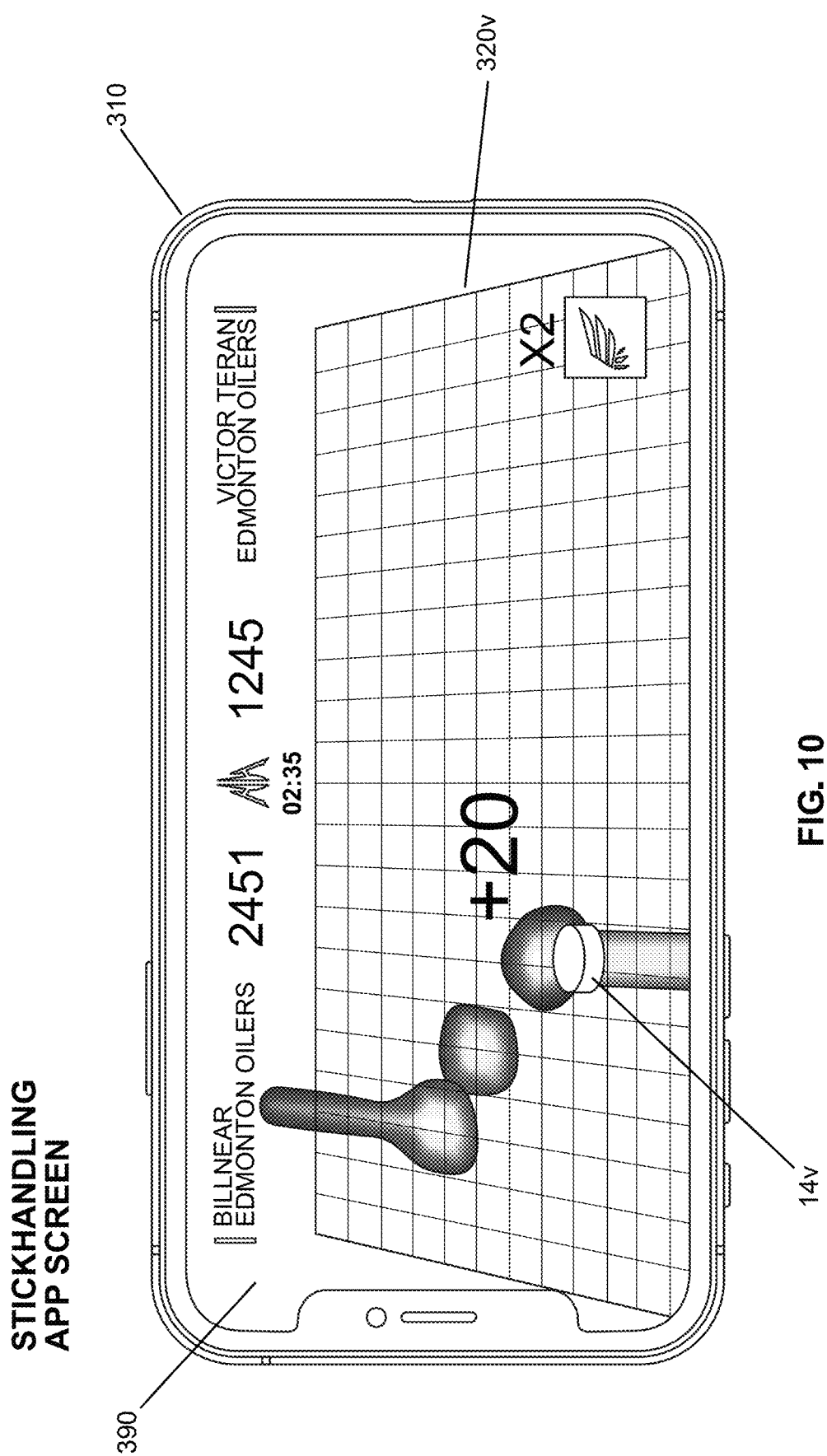
FIG. 10 illustrates a screen view for a stickhandling training game.

FIG. 10 illustrates a screen view for a stickhandling training game 390 displayed on computing device 310, which includes a virtual training surface 320v and virtual hockey puck 14v, as noted above illustrate the position of the actual smart hockey puck 14 on the training surface 300. In this game shown, augmented or virtual lines or features drop down from the top of screen, where the user's objective is to shift the hockey puck to line up with the virtual lines or features as they approach the virtual hockey puck. Points and accuracy can be displayed, as the user further develops their stickhandling control of the smart hockey puck. In some variations, RFID tags can be placed on each side of the blade of the hockey stick. Information regarding which side of the hockey stick blade can then be incorporated into any of the training modes or games. For example, points could be awarded for using the appropriate side of the hockey stick blade. How many times the hockey puck made contact with the hockey stick blade could be another metric that is determined. Advanced trainings can be done once a user hits a certain proficiency in various training and game modes.

FIGS. 11A-D illustrate a connected hockey training system 1100A-D that includes a smart hockey puck 14, mobile computing device 310 and a goal 1110a with a plurality of physical targets 1120a-1128a with embedded or applied RFID tags disposed therein. Similar to the training surfaces noted above, the targets 1120a-1128a can be comprised of multiple layers, such as a top layer, RFID layer and bottom or support layer. The RFID layer can be an M×N grid of RFID tags and have accompanying mapping file that is accessible via a QR code or indicator directing to the mapped filed for the particular goal. The targets 1120a-1128a can be configured to be hung about the goal 1110a, posts or on a wall and sized according to real goal dimensions. In each of FIGS. 11A-D the shooting targets can be positioned at various places on the goal 1110a. These can include Top Right 1120a, Top Middle 1122a, Top left 1124a, Bottom Left 1126a and Bottom right 1128a. A virtual representation of these same targets, as well as the virtual goal 1110b can be displayed once the appropriate mapping file has been received of the targets including corresponding targets of Top Right 1120b, Top Middle 1122b, Top left 1124b, Bottom Left 1126b and Bottom right 1128b.

Figure 11A:
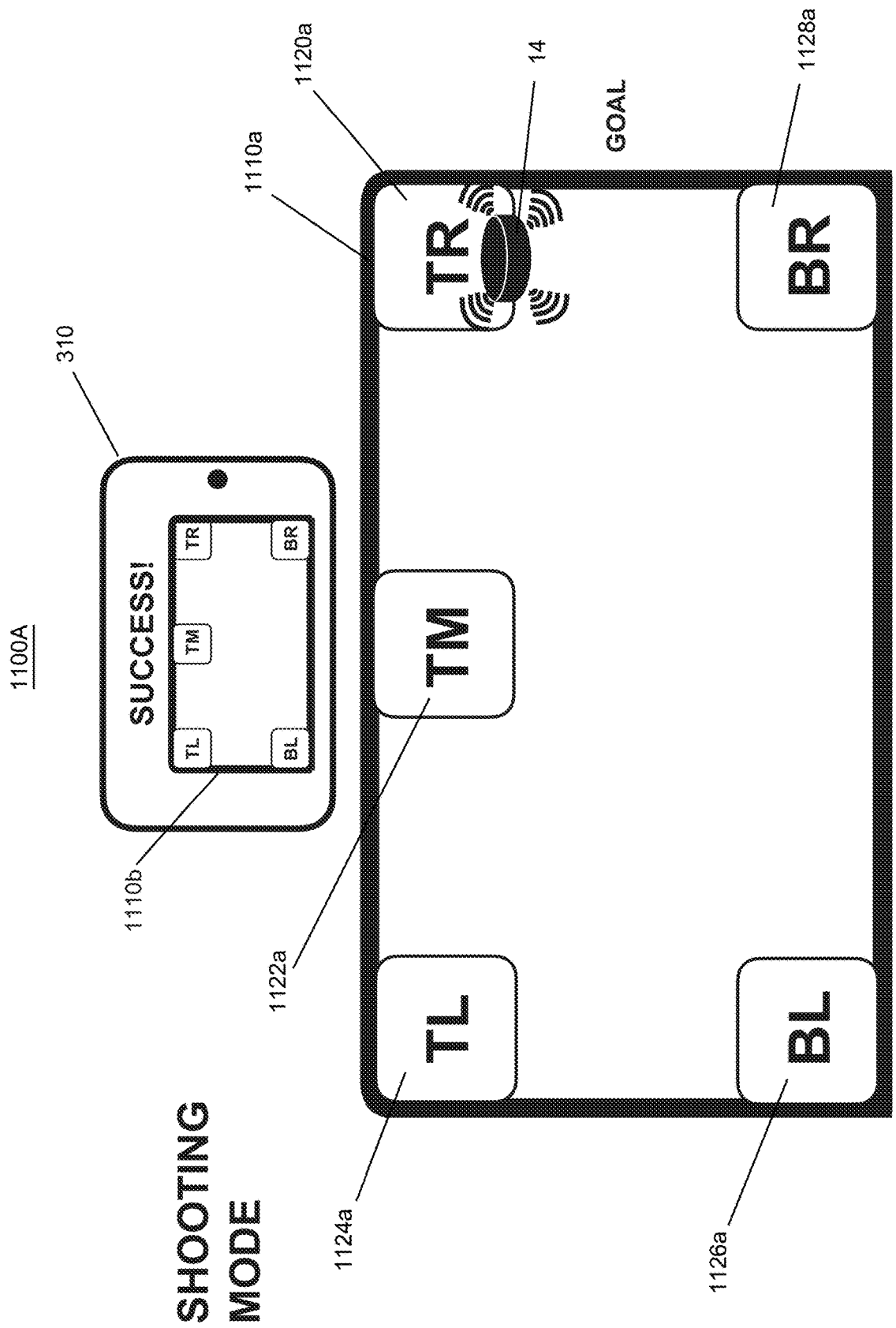
Figure 11B:
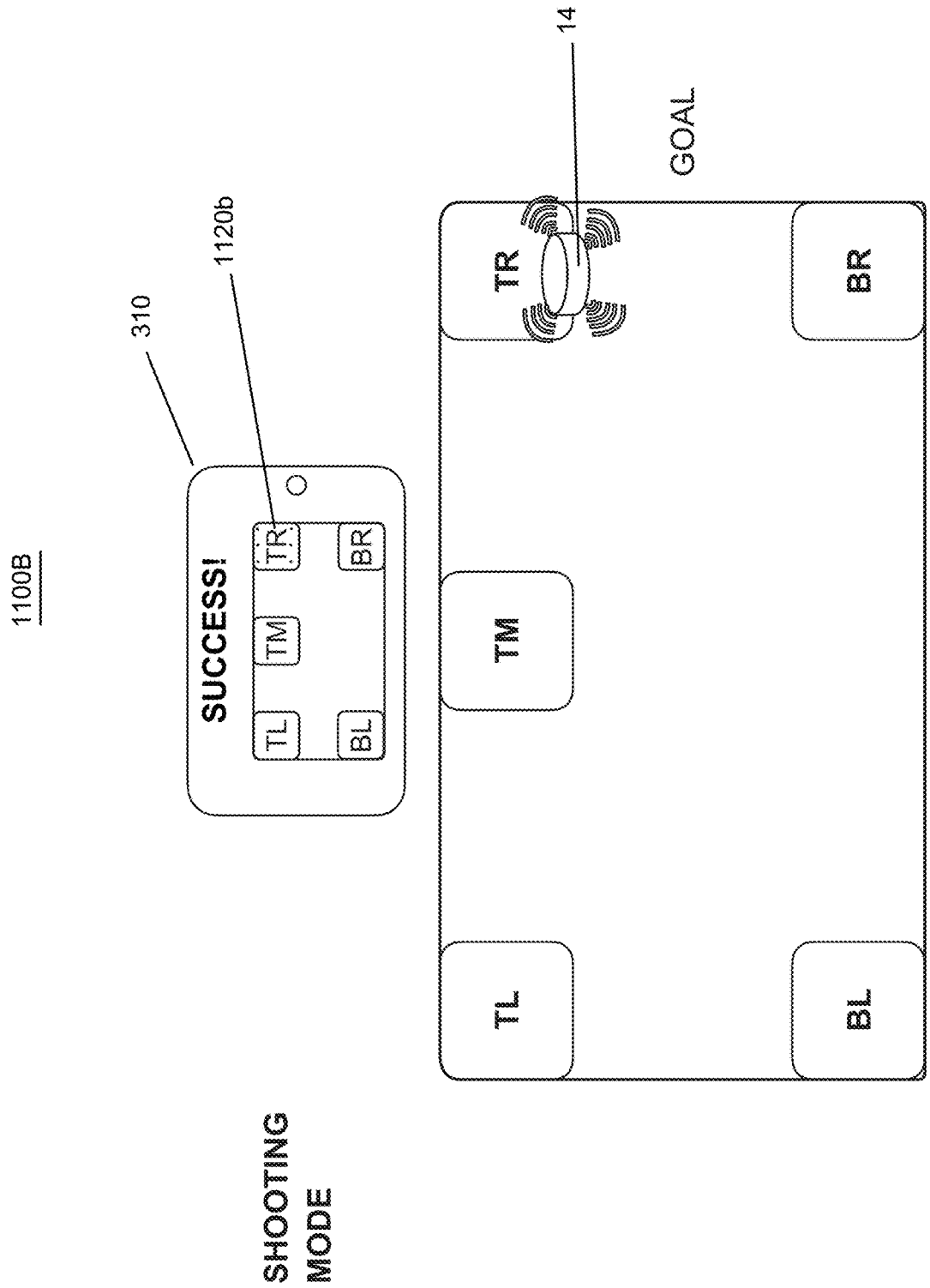
Figure 11C:
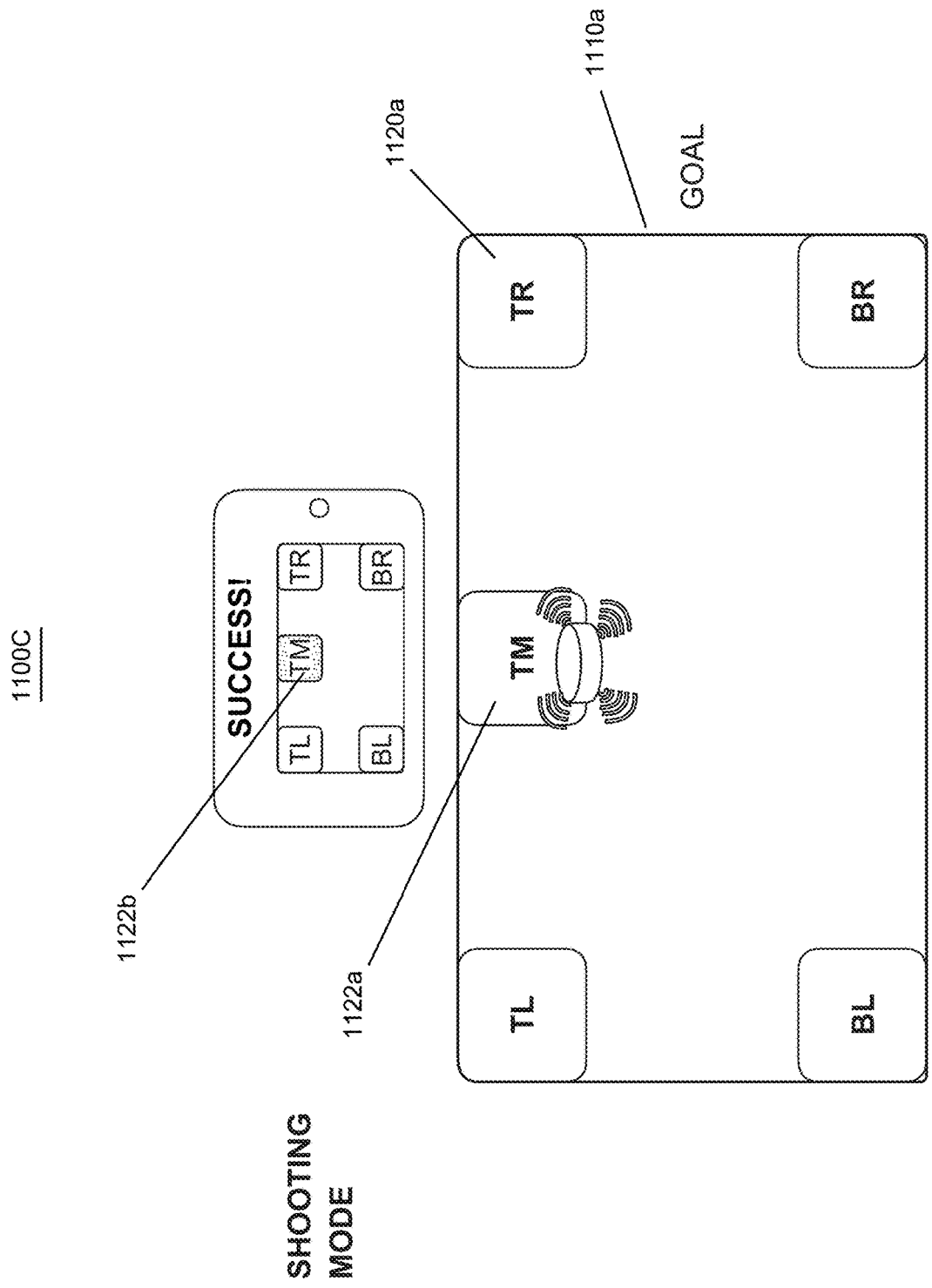

When a player hits a particular target with the smart hockey puck 14, it reads the RFID tags below the targeted area and transmits the information to the computing device 310, where a display indicator illuminates, flashes, changes color or some other indication that the physical target was hit. As shown in FIG. 11B, puck 14 hit the Top Right, which illuminated the virtual 1120b being displayed on the computing device 310. Again in FIG. 11C the Top Middle target of the goal 1110a was hit, causing the virtual 1122b to illuminate. FIG. 11D illustrates a general 'goal' being achieved, but not in one of the designated target areas, so they would not illuminate the virtual targets being displayed. If the intent of the mode was to hit a particular area, then a miss or no-point indicator could be also displayed. One of the advantages of using a smart hockey puck, is when an RFID tag is not read, such as in the scenario where none of the targets is hit, then the smart hockey puck can be configured to send a signal that the shot ended, without reading RFID information, which could indicate to the system that a miss occurred. The shot could be determined using the sensors on the puck, such as the accelerometer, which could also determine when the shot ended.

It should be readily apparent to those skilled in the art, that the targets could be various shapes and sizes and position in various spots across the goal 1110a.

FIGS. 12A-D illustrates another embodiment of a connected hockey training system 1200A-D with a smart hockey puck 14, mobile computing device 310 and a goal 1210 with smart shooting targets with embedded or applied RFID tags. It should be noted that the connected hockey training version shown in FIGS. 11A-D could be formed of a RFID tags only in particular areas of the goal 1110a, whereas in 1200A-D the RFID tags are intended to be displayed across the entire goal area 1210, as 1210 could be an entire sheet having displayed graphics formed in various sections.

For example, shown in FIG. 12A is an illustrated obstacle 1230a, which takes the form of an illustrated hockey goalie, as part of the goal 1210. This same obstacle, can have a virtual representation 1230b displayed on the computing device 310. This information can be obtained from the mapping file, or alternatively generated by taking a photo of the obstacle and associating the photo with the particular goal 1210, such that the application running on the computing device 310 superimposes the picture onto the display of computing device 310.

Figure 12B:
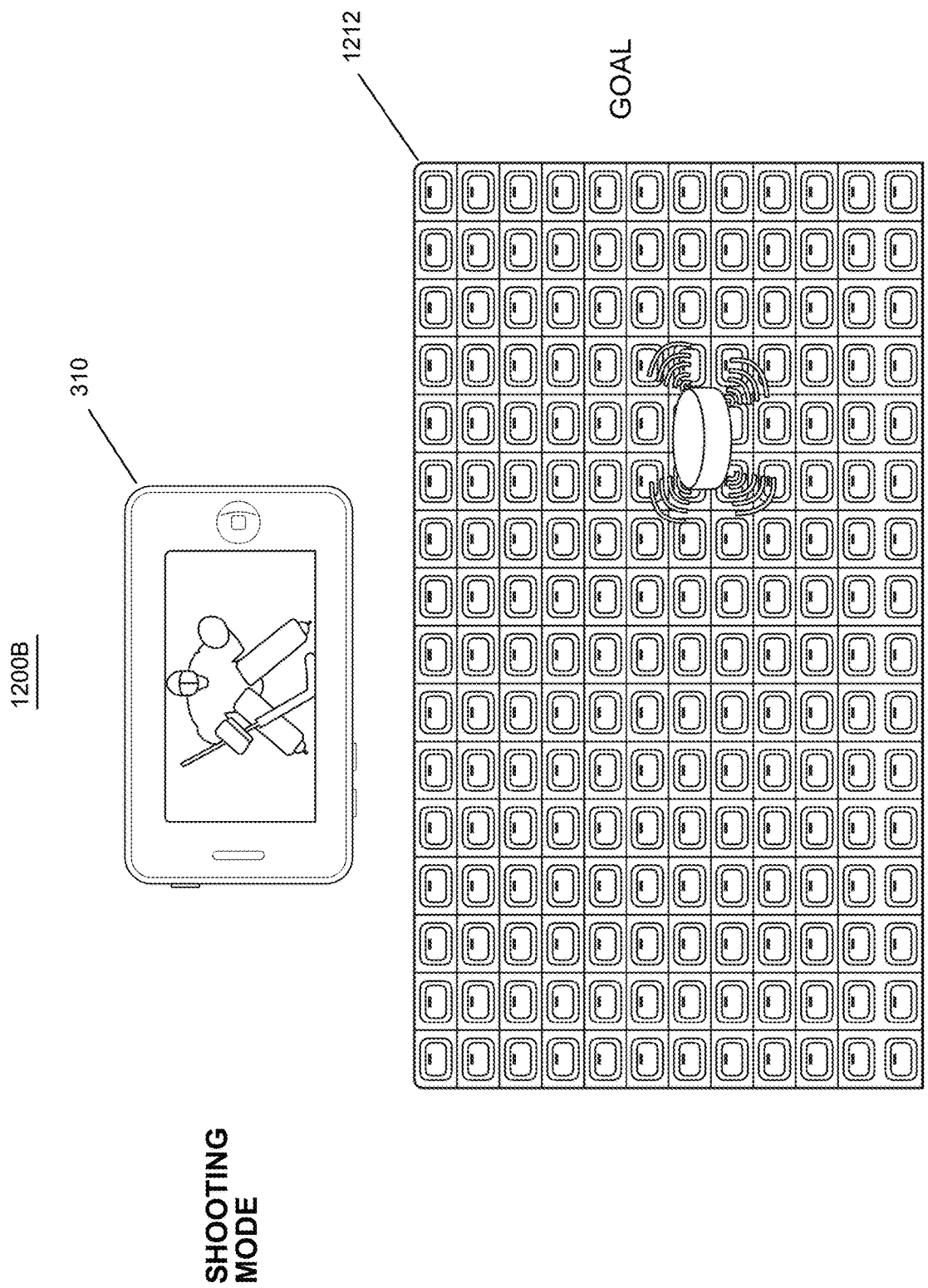

FIG. 12B illustrates the RFID tag layer 1212 to enable a completely covered area for building in obstacles, targets, and knowing where the smart hockey puck is making contact with the goal 1210. It should be noted that by providing a grid of RFID tags the pixel or granularity of location information can be increased, which is then translated to the virtual version being displayed.

Figure 12C:
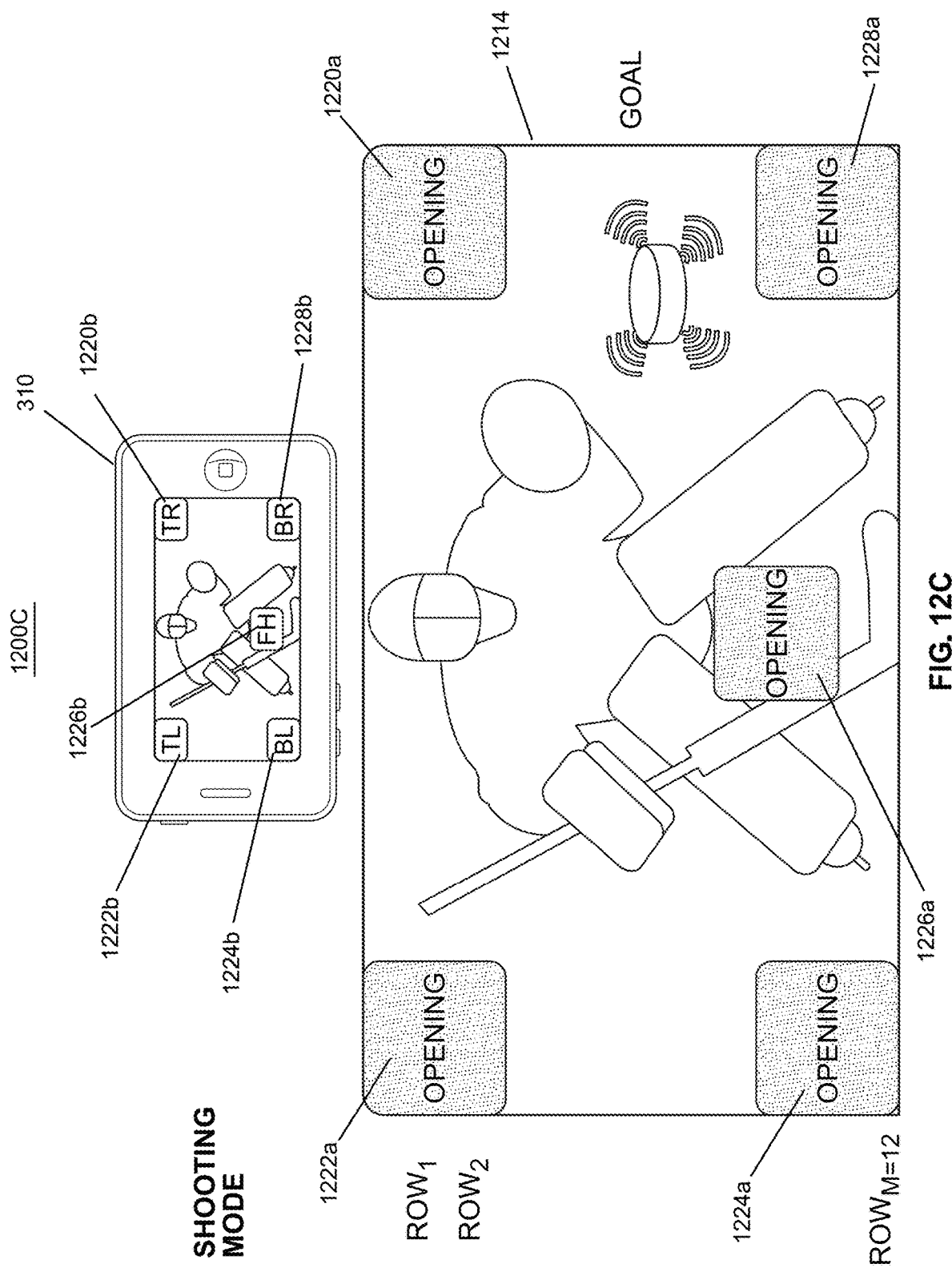

FIG. 12C illustrates each of these noted targets 1220a, 1222a, 1224a, 1226a, and 1228a, along with their virtual targets 1220b, 1222b, 1224b, 1226b, and 1228b displayed on 310. Additionally, the obstacles, hockey goalie, is also displayed. FIG. 12D is illustrative of how those targets appear relative to the RFID tags on the 1214 layer. It should be understood that the smart hockey puck 14 can be configured to read multiple RFID tags, with each tag having an accompanying signal strength and time of reading data point. This information can be used to determine whether or not the smart hockey puck hit the desired spot, as some spots shown have a target covering only part of the RFID tag. By using multiple signals, the accuracy of the spot hit can be increased.

FIGS. 12C-D can illustrate in alternative variation spots or places across 1212 where either RFID tags do not reside, or where there are actual openings or apertures in the target. This may be helpful in scenarios where there is a collection or containment mechanism behind the target.

Figure 13:
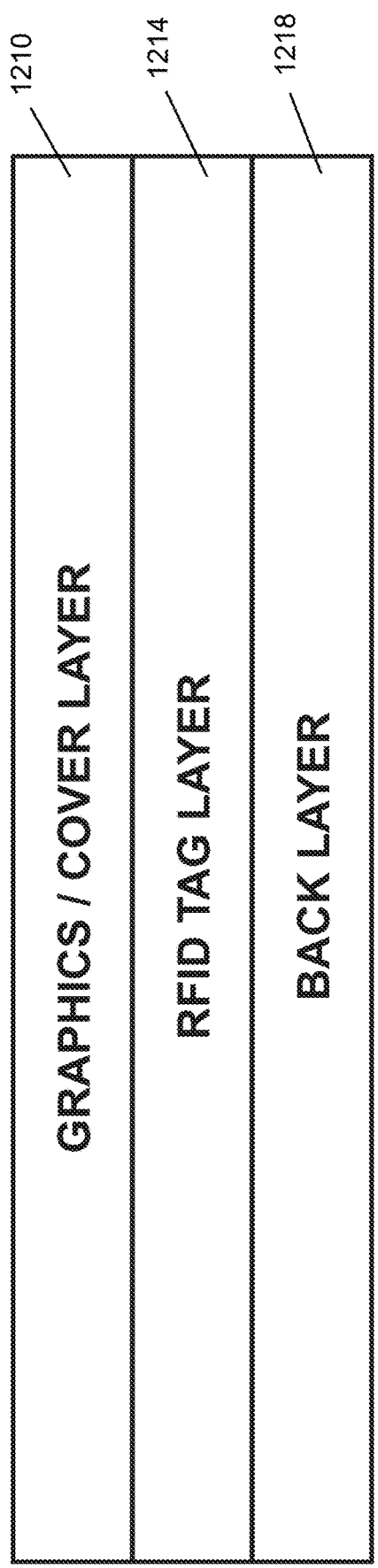
FIG. 13 illustrates a side view of a multi-layer target or goal.

FIG. 13 illustrates a side view of a multi-layer target or goal including the graphics or cover layer 1210, the RFID tag layer 1214, and the back or supporting layer 1218. Similar to the training surfaces above, the hanging or wearable targets as described could also be formed of only two layers, such as the RFID tag layer and the graphics layer.

Figure 14:
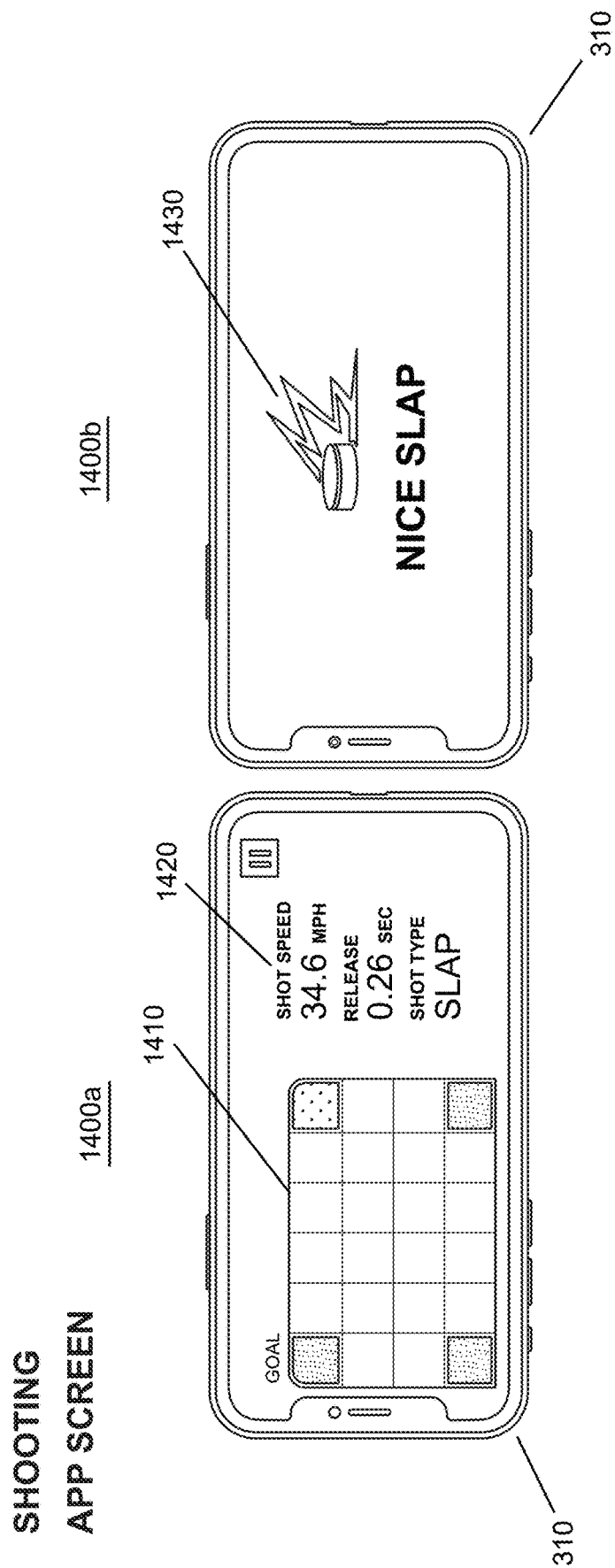
FIG. 14 illustrates mobile app screens for shooting training.

One of the advantages of using the smart hockey puck 14, which can include accelerometers and gyroscopic sensors is that ability to determine the speed, type, angle, release and other metrics associated with a shot or pass. Another advantage as noted above is it enables the RFID tags to be passive as the smart hockey puck provides the signal to power the tags. FIG. 14 illustrates a display of a computing device 310 that illustrates in views 1400a and 1400b additional information associated with the taken shot, including where it hit in the goal area 1410, statistics about the shot 1420, and even display graphics 1430 when a particular achievement or goal was accomplished.

Figure 15:
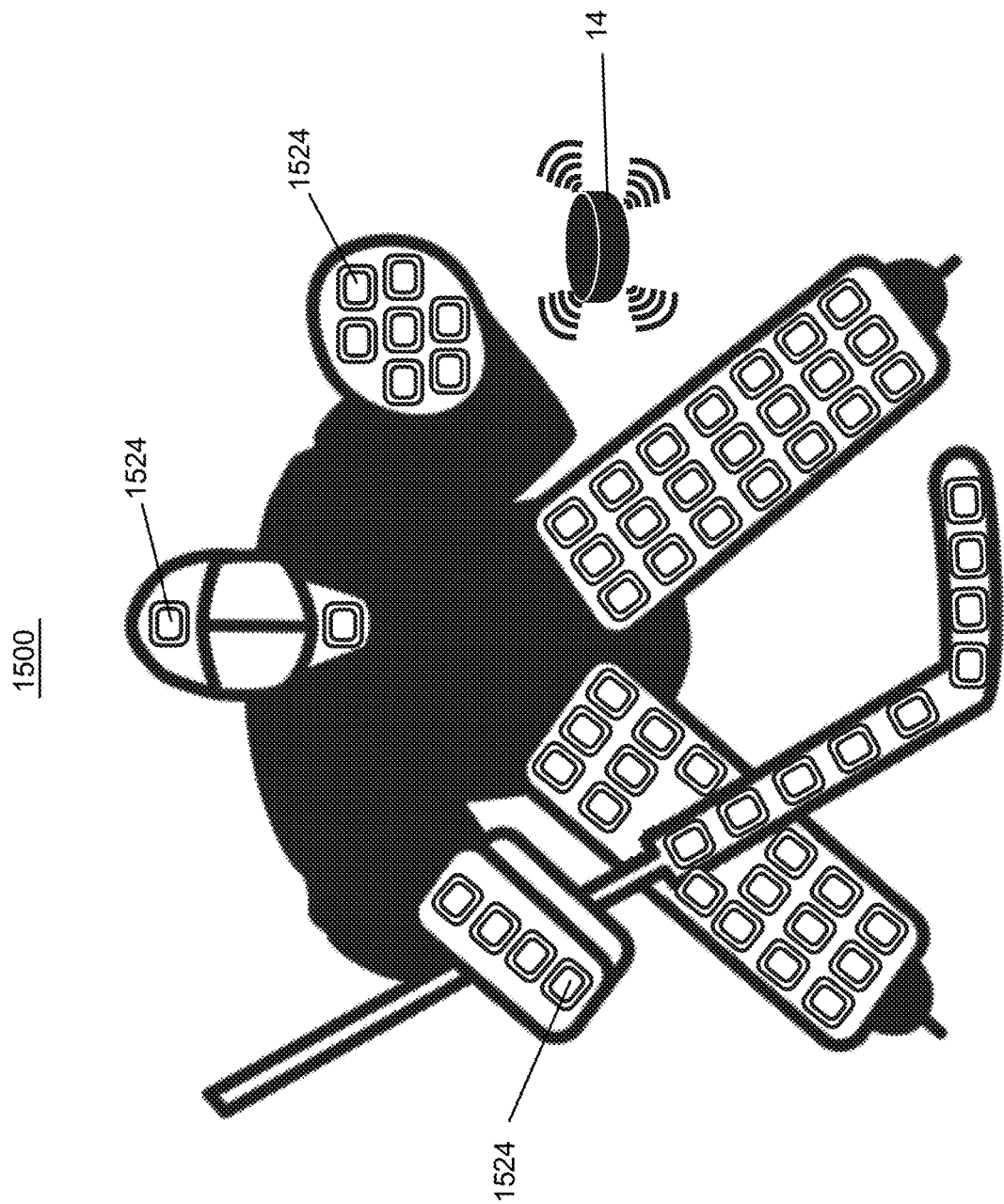
FIG. 15 illustrates embedded or applied RFID tags applied to goalie equipment.

FIG. 15 illustrates embedded or applied RFID tags applied to goalie equipment 1500. RFID tags 1524 can applied all across goalie equipment 1500 worn by a user, to help determine for the person shooting and the goalie blocking where the puck interacted and how. Similar to the training surface or multi-layered hung targets, multi-layer patches applied to the goalie can identify where the puck hit. This can be combined with other sensed data, such as the accelerometer data, to help both the goalie and shooter understand how they are responding, so as to improve their skillset.

FIG. 16 illustrates a mat or roll of RFID tags 1624 placed beneath the ice of an ice or synthetic ice rink 1620 to form a training surface system 1600. As noted above, understanding the position of the hockey puck and the progression through a practice or game can have various practical applications. When coupled with RFID tags on hockey sticks, the progression of the hockey puck can be recorded and replayed on a computing device. As various players interact with the puck, the color or shape of the virtual displayed puck and/or its path can change. For example, if a player on Team A is in control of the puck their pass is intercepted by a player on Team B, the moment the change in team possession occurs can be change the color of the virtual hockey puck. The RFID tag data associated with a hockey stick can be similarly uploaded and associated with a player profile database, like the mapping file. When one of those tags is read by the smart hockey puck and transmitted, the information surrounding that event can then be associated with that particular player profile.

It should be understood that the smart hockey puck, can be used in various modes including live streaming mode, where the data is transferred in real-time or stored in memory for later offloading, processing and analysis.

In certain training modes a VR headset can be worn, while the player uses the smart puck, with the stick and shooting target or cloth or a section of ice or synthetic ice. Augmented figures, such as a goalie can be displayed while the player attempts to shoot on goal or stickhandle. The Virtual Reality Display can also display a motion of the hockey puck that player is to guide the smart puck around, such as illustrated in FIG. 8. As the player goes through the motion, the color of the completed portion changes until the complete motion is finished. The actual path of the motion versus the desired path of the motion can also be displayed, showing the actual motion versus the desired motion. A score can be tabulated regarding accuracy, the motion can be recorded and sent to coaches, trainers and parents.

Similar to hockey motion training of the handling a puck, slap shots and other techniques can be recorded and compared. For example, the task can be to hit a certain part of the hanging goal cloth. A remote display screen can be viewed by a coach, trainer or parent while the player is attempting to make the desired shot, with each shot having data regarding speed, rotation, and ultimately where the shot went being displayed.

One of the advantages of the hockey training system is that the RFID reader is in the smart hockey puck, so that placing RFID tags and uploading their mapping files to the training system application becomes scalable and even transferrable from location to location.

Another advantage of using a smart hockey puck as partially alluded to above, is the ability to bridge the gap with additional information in between RFID readings. For example, when a slap shot occurs, it could initially be reading RFID tags on the training surface, but when the puck elevates becomes far enough away from the training surface tags that the next recorded tag is either a target or the ground where it landed again. When recreating the shot virtually on the display of the computing device, the speed, angle, altitude, rotation and other information can be obtained from the sensors on the smart hockey puck, which can then be used to create a virtual path the shot took. In summary, the sensor information from the puck can augment when RFID tags are not read and alternatively, the RFID tag readings can help calibrate and confirm the accuracy of the sensor readings, by having a secondary information to compare it to. Thus, enabling the system to be very accurate and have the ability to self-diagnose and re-calibrate.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

The invention claimed is:

1. A hockey motion training system comprising:
a smart puck having an electronics board embedded therein, wherein the electronics board is coupled to an RFID scanning system, configured to read a plurality of RFID tags, and a wireless communication component configured to transferred scanned RFID tag data to a computing device;
a grid of RFID tags embedded in or disposed under a training surface;
a plurality of targetable RIFD tags disposed about a target positioned above the training surface;
a training application running on the computing device, and configured to:
receive mapping data associated with the grid of RFID tags, and mapping data associated with the plurality of targetable RFID tags,
receive sensed RFID tag data from the smart puck,
generate and display motion data associated with the smart puck based on comparing received mapping data from both the grid of RFID tags and plurality of targetable RFID tags, to the received sensed RFID tag data from the smart puck to generate location data of the smart puck at a given time relative to at least one of the grid of RFID tags and/or at least one of the plurality of targetable RFID tags; and
wherein the generating and displaying comprises displaying, on a computing device, a virtual representation of the training surface and a virtual puck positioned relative to the training surface; and
saving and generating statistics based on the generated motion data, the statistics comprising an accuracy of path of the smart hockey puck, top speed of the smart hockey puck, average speed, and a comparison of the generated motion data to a second generated motion data.

2. The hockey motion training system of claim 1, wherein in the training application is further configured to run a training module, which can include display a particular training motion pattern to be performed by a user of the hockey motion training system.

3. The hockey motion training system of claim 2, wherein in the training application is further configured to compare received sensed RFID tag data to run training module and determine at least one compliance parameter.

4. The hockey motion training system of claim 3, wherein the compliance parameters include: accuracy of motion, timing associated with training module, speed of motion, and location.

5. The hockey motion training system of claim 1, wherein in the training surface is comprised of at least one of: layer of ice, layer of synthetic ice, and a base layer.

6. The hockey motion training system of claim 5, wherein the grid of RFID tags is disposed between the base layer and the ice or synthetic ice layer.

7. The hockey motion training system of claim 1, further including a plurality of wearable RIFD tags disposed on a target user.

8. The hockey motion training system of claim 1, wherein the computing device includes a head mounted display.

9. The hockey motion training system of claim 1 wherein the motion data comprises acceleration, velocity, position, orientation, jerk, rotational velocity, rotational acceleration, rotational position, temperature, serial number, tag identifier, player identification, and battery level of the smart puck.

10. The hockey motion training system of claim 1 wherein the target comprises a front cover layer; an RFID tag layer below the cover layer, and a back layer below the RFID tag layer.

11. The hockey motion training system of claim 1 wherein the smart puck comprises an accelerometer sensor and a gyroscopic sensor.

12. The hockey motion training system of claim 11 wherein the training application running on the computing device is further configured to receive accelerometer sensor data and gyroscopic sensor data from the smart puck, and
generate and display motion data associated with the smart puck based on comparing received mapping data to received sensed RFID tag data combined with the received accelerometer sensor data and gyroscopic sensor data.

13. The hockey motion training system of claim 1 further comprising a hockey stick, the hockey stick comprising one or more RFID tags on a blade of the hockey stick.

14. A hockey skills training method comprising the steps of:
scanning, using a computerized scanning device, a unique identifier of each of a plurality of RFID tags arranged as a grid of RFID tags disposed under a training surface to load a mapping data set corresponding to the unique identifiers of the plurality of RFID tags;
repeating the scanning step for each of a plurality of training surfaces to load a mapping data set corresponding to each of the plurality of training surfaces;
associating each mapping data set to a user;
generating at least a portion of a virtual representation of the grid on a display;
selecting from a list a training task to be performed using a smart hockey puck that includes an RFID reader and wireless transmitter, wherein the training task includes mimicking at least portion of a pattern;
generating a virtual hockey puck on the display;
tracking the motion of the smart hockey puck by comparing sensed RFID tags associated with the grid to the mapping data set;
determining based on the tracked motion at least one of: accuracy of the pattern, time to complete the training task, and speed of accomplishing the training task;
generating a virtual target on a display as part of one of the training tasks about which a user is to shoot the smart hockey puck at, and wherein the smart hockey puck further includes an accelerometer to determine the velocity and angle of each shot; and receiving an input of the smart hockey puck from a plurality of targetable RIFD tags disposed about a target positioned above the training surface; and comparing the received input on the target and the generated virtual target;

wherein the step of generating at least a portion of a virtual representation of the grid on a display, generating a virtual hockey puck on the display, and tracking the motion of the smart hockey puck comprises comparing received mapping data from both the grid of RFID tags and plurality of targetable RFID tags, to the received sensed RFID tag data from the smart puck to generate location data of the smart puck at a given time relative to at least one of the grid of RFID tags and/or at least one of the plurality of targetable RFID tags; and further comprising the step of displaying the generated and tracked motion comprises displaying, on a computing device, a virtual representation of the training surface and a virtual puck positioned relative to the training surface; and saving and generating statistics based on the generated motion data, the statistics comprising an accuracy of path of the smart hockey puck, top speed of the smart hockey puck, average speed, and a comparison of the generated motion data to a second generated motion data.

15. The hockey skills training method of claim 14, further including the step of comparing the completed training task to a previously completed training task.

16. The hockey skills training method of claim 14, further including the step of comparing the completed training task to a database of users who have previously completed training task to determine a ranking score.

17. The hockey skills training method of claim 14, further including the step of generating a virtual obstacle on a display as part of one of the training tasks about which a user is to navigate the smart hockey puck around.

18. The hockey skills training method of claim 14, wherein the display is a virtual reality headset and further includes the step of a user wearing the virtual reality headset while performing the training task.

19. The hockey skills training method of claim 14, wherein the unique identifier is a scannable QR code on each of the plurality of training surfaces that allows the stored mapping file unique to the grid of RFID tags on that training surface to be downloaded from a cloud server.

* * * * *